(12) United States Patent
Muraoka

(10) Patent No.: US 10,993,238 B2
(45) Date of Patent: Apr. 27, 2021

(54) APPARATUS AND METHOD FOR RADIO COMMUNICATION

(71) Applicant: NEC Corporation, Tokyo (JP)

(72) Inventor: Kazushi Muraoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 26 days.

(21) Appl. No.: 16/604,613

(22) PCT Filed: Jan. 18, 2018

(86) PCT No.: PCT/JP2018/001389
§ 371 (c)(1),
(2) Date: Oct. 11, 2019

(87) PCT Pub. No.: WO2018/193676
PCT Pub. Date: Oct. 25, 2018

(65) Prior Publication Data
US 2020/0128527 A1    Apr. 23, 2020

(30) Foreign Application Priority Data
Apr. 19, 2017 (JP) .............................. JP2017-082806

(51) Int. Cl.
H04L 12/26 (2006.01)
H04W 72/04 (2009.01)
(Continued)

(52) U.S. Cl.
CPC ......... H04W 72/048 (2013.01); H04W 8/005 (2013.01); H04W 72/082 (2013.01)

(58) Field of Classification Search
CPC ............. H04W 48/16; H04W 72/0426; H04W 72/048; H04W 72/082; H04W 8/005
See application file for complete search history.

(56) References Cited

U.S. PATENT DOCUMENTS

2010/0323694 A1    12/2010  Kltintas
2016/0381630 A1*   12/2016  Krishnamoorthy ... H04W 76/18
                                                         370/329
(Continued)

FOREIGN PATENT DOCUMENTS

JP    2009-200773 A    9/2009
WO   2012144941 A1    10/2012
(Continued)

OTHER PUBLICATIONS

Japanese Office Action for JP Application No. 2019-513227 dated Sep. 23, 2020 with English Translation.
(Continued)

Primary Examiner — Minh Trang T Nguyen

(57) ABSTRACT

A processing apparatus (3A) acquires the number of one or more neighbor cells (31B) to which one or more neighbor-cell D2D radio terminals (2G), located in proximity to a first D2D communication pair (2E) belonging to a first cell (31A), belong. In addition, depending on the acquired number of the one or more neighbor cells (31B), the processing apparatus (3A) determines, from D2D radio resources that are shared among three or more cells (31A, 31B, 31E), a first part allocatable to the first D2D communication pair (2E). It is thus, for example, possible to contribute to efficient use of D2D radio resources shared among at least three cells adjacent to one another.

19 Claims, 18 Drawing Sheets

(51) Int. Cl.
*H04W 8/00* (2009.01)
*H04W 72/08* (2009.01)

(56) References Cited

U.S. PATENT DOCUMENTS

| | | |
|---|---|---|
| 2018/0049104 A1 | 2/2018 | Van Phan et al. |
| 2018/0063825 A1 | 5/2018 | Van Phan et al. |
| 2018/0152807 A1 | 5/2018 | Van Phan et al. |

FOREIGN PATENT DOCUMENTS

| | | |
|---|---|---|
| WO | 2016/141980 A1 | 9/2016 |
| WO | 2016/141983 A1 | 9/2016 |
| WO | 2016/177397 A1 | 11/2016 |
| WO | 2016/177934 A1 | 11/2016 |
| WO | 2016194279 A1 | 12/2016 |

OTHER PUBLICATIONS

"Discussion on Discovery Resource Pool Monitoring", Coolpad, 3GPP TSG-RAN WG2 #89, R2-150176, Feb. 9-13, 2015, (3 pages total).

International Search Report dated Apr. 10, 2018, in International Application No. PCT/JP2018/001389.

Written Opinion of the International Searching Authority dated Apr. 10, 2018, in application No. PCT/JP2018/001389.

\* cited by examiner

APPARATUS AND METHOD FOR RADIO COMMUNICATION

This application is a National Stage Entry of PCT/JP2018/001389 filed on Jan. 18, 2018, which claims priority from Japanese Patent Application 2017-082806 filed on Apr. 19, 2017, the contents of all of which are incorporated herein by reference, in their entirety.

TECHNICAL FIELD

The present disclosure relates to inter-terminal direct communication (device-to-device (D2D) communication).

BACKGROUND ART

A form of communication in which a radio terminal directly communicates with another radio terminal without communicating through an infrastructure network such as a base station is called device-to-device (D2D) communication. The D2D communication includes at least one of Direct Communication and Direct Discovery. In some implementations, a plurality of radio terminals supporting D2D communication form a D2D communication group autonomously or under the control of a network, and communicate with another radio terminal in the formed D2D communication group.

Proximity-based services (ProSe) specified in 3GPP Releases 12 and 13 are examples of the D2D communication. ProSe direct discovery is performed through a procedure in which a radio terminal capable of performing ProSe (i.e., ProSe-enabled User Equipment (UE)) detects another ProSe-enabled UE by using only the capability of a radio communication technology (e.g., Evolved Universal Terrestrial Radio Access (E-UTRA) technology) possessed by these two UEs. ProSe direct discovery may be performed by three or more ProSe-enabled UEs.

ProSe direct communication enables establishment of a communication path between two or more ProSe-enabled UEs existing in a direct communication range, for example, after the ProSe direct discovery procedure. In other words, ProSe direct communication enables a ProSe-enabled UE to directly communicate with another ProSe-enabled UE, without communicating through a Public Land Mobile Network (PLMN) including a base station (eNodeB (eNB)). ProSe direct communication may be performed by using a radio communication technology that is also used to access an eNB (i.e., E-UTRA technology) or by using a Wireless Local Area Network (WLAN) radio technology (i.e., IEEE 802.11 radio technology).

In 3GPP Releases 12 and 13, a radio link between radio terminals (UEs) used for direct communication or direct discovery is referred to as a Sidelink. Sidelink transmission uses the Long Term Evolution (LTE) frame structure defined for an uplink and a downlink and uses a subset of uplink resources in frequency and time domains. A radio terminal (i.e., UE) performs sidelink transmission by using Single Carrier FDMA (Frequency Division Multiple Access) (SC-FDMA), which is also used in the uplink.

In 3GPP 12 ProSe, allocation of a radio resource to a UE for sidelink transmission is performed by a radio access network (e.g., Evolved Universal Terrestrial Radio Access Network (E-UTRAN)). A UE that has been permitted to perform sidelink communication by a ProSe function performs ProSe direct discovery or ProSe direct communication by using a radio resource allocated by a radio access network node (e.g., eNodeB (eNB)).

Regarding ProSe direct communication, two resource allocation modes, i.e., scheduled resource allocation and autonomous resource selection are specified. The scheduled resource allocation and the autonomous resource selection are referred to as "sidelink transmission mode 1" and "sidelink transmission mode 2", respectively.

In the scheduled resource allocation for ProSe direct communication, when a UE desires to perform sidelink transmission, the UE requests an eNB to allocate radio resources for sidelink transmission, and the eNB allocates resources for sidelink control and data to the UE. Specifically, a UE transmits to an eNB a scheduling request to request an uplink (UL) data transmission resource (i.e., Uplink Shared Channel (UL-SCH) resource) and then transmits a Sidelink Buffer Status Report (Sidelink BSR) to the eNB by using an UL data transmission resource allocated by an uplink grant (UL grant). The eNB determines sidelink transmission resources to be allocated to the UE based on the Sidelink BSR and transmits a sidelink grant (SL grant) to the UE.

The SL grant is defined as Downlink Control Information (DCI) format 5. The SL grant (i.e., DCI format 5) contains contents such as a Resource for PSCCH, Resource block assignment and hopping allocation, and a time resource pattern index. The Resource for PSCCH indicates radio resources for a sidelink control channel (i.e., Physical Sidelink Control Channel (PSCCH)). The Resource block assignment and hopping allocation is used to determine frequency resources, i.e., a set of subcarriers (resource blocks), for transmitting a sidelink data channel (i.e., Physical Sidelink Shared Channel (PSSCH)) for sidelink data transmission. The Time resource pattern index is used to determine time resources, i.e., a set of subframes, for transmitting the PSSCH.

Note that, strictly speaking, the resource block means time-frequency resources in LTE and LTE-Advanced and is a unit of resources specified by consecutive OFDM (or SC-FDMA) symbols in the time domain and consecutive subcarriers in the frequency domain. In the case of Normal cyclic prefix, one resource block includes 12 consecutive OFDM (or SC-FDMA) symbols in the time domain and 12 subcarriers in the frequency domain.

That is, the Resource block assignment and hopping allocation and the Time resource pattern index designate a resource block for transmitting the PSSCH. The UE (i.e., a sidelink transmitting UE) determines a PSCCH resource and a PSSCH resource according to the SL grant.

Meanwhile, in the autonomous resource selection for ProSe direct communication, a UE autonomously selects resources for sidelink control (i.e., PSCCH) and data (i.e., PSSCH) from a resource pool(s) set by an eNB. The eNB may allocate a resource pool(s) for the autonomous resource selection to the UE in a System Information Block (SIB) 18. The eNB may allocate a resource pool for the autonomous resource selection to the UE in Radio Resource Control (RRC)_CONNECTED via dedicated RRC signaling. This resource pool may be available also when the UE is in RRC_IDLE.

When direct transmission is performed on a sidelink, a UE on a transmitting side (i.e., a D2D transmitting UE) (hereinafter referred to as a transmitting terminal or a transmitting UE) transmits Scheduling Assignment information by using a portion of radio resources (i.e., resource pool) for a sidelink control channel (i.e., PSCCH). The scheduling assignment information is also referred to as Sidelink Control Information (SCI) format 0. The scheduling assignment information includes contents such as resource block assignment and hopping allocation, a time resource pattern index, and a Modulation and Coding Scheme (MCS). In the case of the above-described scheduled resource allocation, the Resource block assignment and hopping allocation and the time resource pattern index indicated by the Scheduling Assignment (i.e., SCI format 0) follow the Resource block assignment and hopping allocation and the time resource pattern index indicated by the SL grant (i.e., DCI format 5) received from the eNB.

The transmitting UE transmits data on the PSSCH by using a radio resource according to the scheduling assignment information. A UE on a receiving side (i.e., a D2D receiving UE) (hereinafter referred to as a receiving UE or a receiving terminal) receives the scheduling assignment information from the transmitting UE on the PSCCH and receives the data on the PSSCH according to the received scheduling assignment information. Note that the term "transmitting UE" just focuses on a transmission operation of a UE and does not mean a UE dedicated for transmission. Similarly, the term "receiving UE" is an expression for expressing a receiving operation of a UE and does not mean a UE only for reception. That is, the transmitting UE is able to perform a receiving operation and the receiving UE is able to perform a transmitting operation.

Similarly as for ProSe direct discovery, two resource allocation modes, i.e., autonomous resource selection and scheduled resource allocation are specified. The autonomous resource selection and the scheduled resource allocation are referred to as "sidelink discovery Type 1" and "sidelink discovery Type 2", respectively.

In the autonomous resource selection for ProSe direct discovery (i.e., sidelink discovery Type 1), a UE that desires transmission (announcing) of a discovery signal (i.e., Physical Sidelink Shared Channel (PSDCH)) autonomously selects radio resources from a resource pool. That is, in Sidelink discovery Type 1, radio resources are allocated on a non-UE specific basis.

In contrast, in the scheduled resource allocation for ProSe direct discovery (i.e., sidelink discovery Type 2), a UE requests an eNB to allocate resources for announcement via RRC signaling. The eNB allocates resources for announcement from a resource pool to the UE. When the scheduled resource allocation is used, the eNB indicates in a System Information Block (SIB 19) that it supports provision of resources for monitoring of ProSe direct discovery but does not provide resources for announcement. Regarding Type 2, though two types, i.e., Type 2A and Type 2B had been discussed, only Type 2B is specified in the current Releases 12 and Release 13. In Type 2B, an eNB allocates radio resources for transmission of a discovery signal (PSDCH) to a UE in a semi-persistent manner. In contrast to this, in Type 2A, which is not specified in the current 3GPP Releases 12 and 13, an eNB allocates radio resources for transmission of a discovery signal (PSDCH) dynamically to a UE in each discovery period (i.e., PSDCH period).

CITATION LIST

Patent Literature

Patent Literature 1: International Patent Publication No. WO 2016/194279
Patent Literature 2: International Patent Publication No. WO 2012/144941

SUMMARY OF INVENTION

Technical Problem

The inventor has found some problems regarding the D2D communication and has obtained some modifications for addressing them.

To be specific, the inventor has studied an architecture that permits spatial reuse of radio resources among a plurality of D2D transmissions. A plurality of D2D transmissions simultaneously use the same radio resource, which contributes to improvement in the efficiency of use of radio resources. The radio resources are, for example, time resources, frequency resources, time-frequency resources, orthogonal code resources, transmission power resources, or any combination thereof. In the case of 3GPP ProSe, the radio resources are time-frequency resources and their minimum unit is the above-described resource block. However, when D2D communication pairs located in proximity to each other use the same radio resource at the same time, it could cause interference among the plurality of D2D transmissions. Note that, the terms "D2D communication pair" and "D2D pair" in this specification mean a pair of a D2D transmitting terminal (UE) and a D2D receiving terminal (UE) that perform D2D transmission.

The inventor has come up with a radio resource allocation method including allocating radio resources to a plurality of D2D transmissions in accordance with an allocation rule that permits two D2D communication pairs that are not in proximity to each other to spatially reuse an identical radio resource but prevents two D2D communication pairs in proximity to each other from using an identical radio resource (see Patent Literature 1). The method disclosed in Patent Literature 1 contributes to enabling efficient spatial reuse of radio resources in a plurality of D2D transmissions.

Further, Patent Literature 1 discloses whether a D2D communication pair (or its transmitting terminal) is in a proximity relationship with a radio terminal belonging to a neighbor cell is taken into account when a base station allocates radio resources for D2D transmission performed by this D2D communication pair (or transmitting terminal). Specifically, the base station detects whether a first D2D communication pair located within the coverage of its cell (hereinafter referred to as a first cell) has a proximity relationship with a neighbor-cell radio terminal (or a neighbor-cell D2D communication pair) belonging to a neighbor cell (hereinafter referred to as a second cell). When a radio terminal (or D2D communication pair) belonging to the second cell is located in proximity to the first D2D communication pair, the base station allocates a first prioritized radio resource that has been set to the first cell in advance, preferentially over other radio resources, to D2D transmission performed by the first D2D communication pair. On the other hand, the base station preferentially allocates a radio resource other than the first prioritized radio resource to D2D transmission performed by a D2D communication pair that is not in a proximity relationship with any neighbor-cell radio terminal (or neighbor-cell D2D communication pair). The radio resources other than the prioritized radio resource of the first cell may include a prioritized radio resource for the second cell and non-prioritized radio resources that have been set to neither the prioritized radio resource of the first cell nor the prioritized radio resource of the second cell. Such a radio resource allocation operation can contribute to preventing interference in radio resources between neighbor cells.

The inventor has studied modification of the radio resource allocation method disclosed in Patent Literature 1. In some implementations disclosed in Patent Literature 1, when three cells, i.e., a first cell, a second cell, and a third cell, are neighbor to one another, a first base station serving a first cell limits the resources allocatable to a first D2D communication pair to the prioritized resources for the first cell within the whole D2D radio resources shared among at least the three cells when the first D2D communication pair is located in proximity to a D2D radio terminal belonging to the second or third cell. However, from the viewpoint of efficient use of radio resources, if the first D2D communication pair is in proximity to a D2D radio terminal belonging to the second cell, but is not in proximity to any D2D radio terminal belonging to the third cell, it may be preferable that the prioritized resource for the third cell can also be allocated to the first D2D communication pair.

Patent Literature 2 discloses that a base station informs neighbor base stations about its D2D allocated resources to avoid interference between cells in D2D communication. Patent Literature 2 does not provide, however, teachings for solving the above-described problem.

One object to be attained by the embodiments disclosed herein is to provide an apparatus, a method, and a program that contribute to enabling efficient use of D2D radio resources shared among at least three cells adjacent to one another. It should be noted that this object is merely one of the objects to be attained by the embodiments disclosed herein. Other objects or problems and novel features will be made apparent from the following description and the accompanying drawings.

Solution to Problem

In a first aspect, a processing apparatus includes at least one memory and at least one processor coupled to the at least one memory. The at least one processor is configured to acquire the number of one or more neighbor cells to which one or more neighbor-cell D2D radio terminals, located in proximity to a first device-to-device (D2D) communication pair belonging to a first cell, belong. In addition, the at least one processor is configured to, depending on the number of the one or more neighbor cells, determine, from D2D radio resources that are shared among three or more cells including the first cell, a first part allocatable to the first D2D communication pair.

In a second aspect, a method includes:

(a) acquiring the number of one or more neighbor cells to which one or more neighbor-cell D2D radio terminals, located in proximity to a first device-to-device (D2D) communication pair belonging to a first cell, belong; and (b) depending on the number of the one or more neighbor cells, determining, from D2D radio resources that are shared among three or more cells including the first cell, a first part allocatable to the first D2D communication pair.

In a third aspect, a program includes a set of instructions (software codes) that, when loaded into a computer, causes the computer to perform a method according to the above-described second aspect.

Advantageous Effects of Invention

According to the above-described aspects, it is possible to provide an apparatus, a method, and a program that contribute to enabling efficient use of D2D radio resources shared among at least three cells adjacent to one another.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining different objects or solving different problems and contribute to obtaining different advantages.

The following descriptions on the embodiments mainly focus on modification to Prose specified in 3GPP Release 12 (LTE-Advanced) and Release 13 (LTE-Advanced Pro). However, these embodiments are not limited to being applied to LTE-Advanced, LTE-Advanced Pro, and modification thereof, and may also be applied to D2D communication in other mobile communication networks or systems.

First Embodiment

Figure 1:
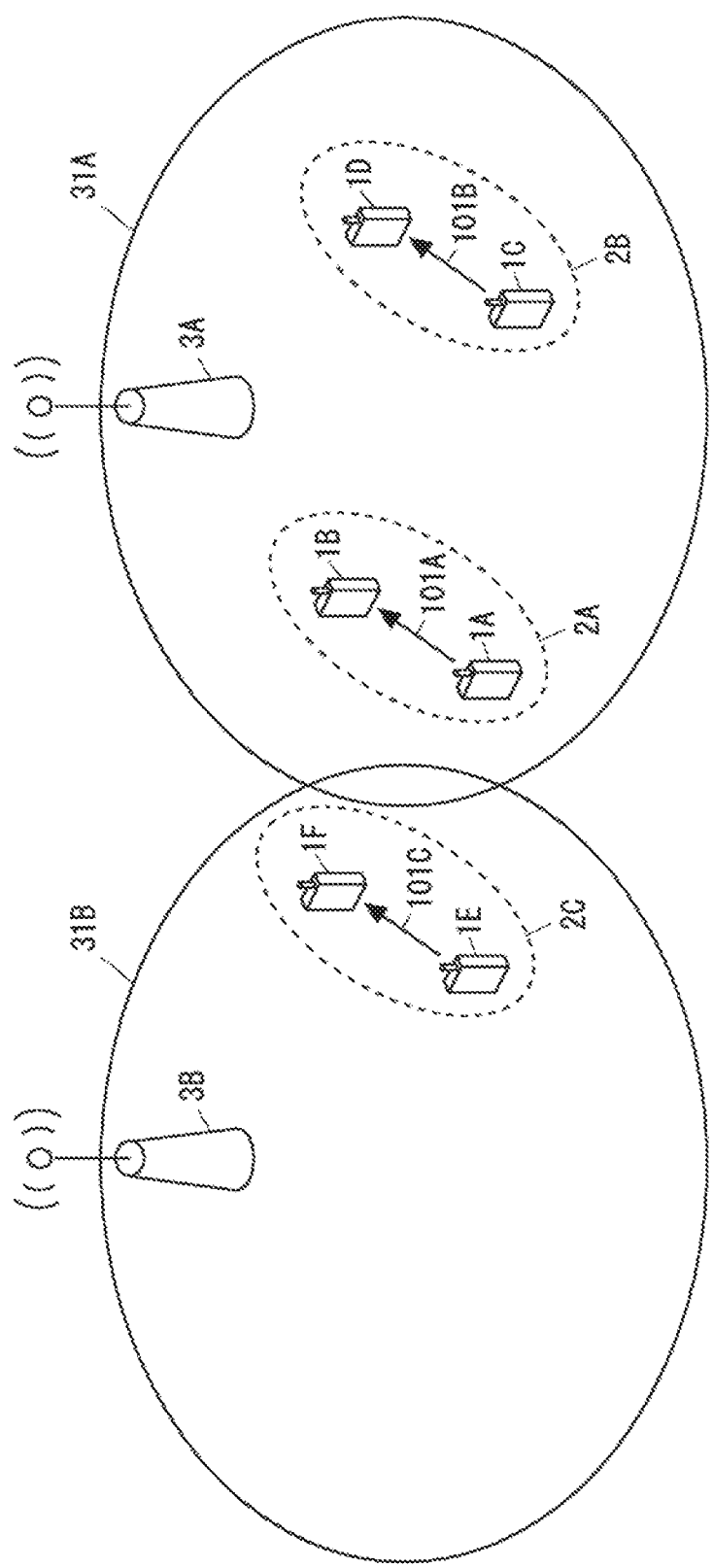
FIG. 1 is a diagram showing a configuration example of a radio communication network according to an embodiment.

FIG. 1 shows a configuration example of a radio communication network according to this embodiment. Specifically, FIG. 1 shows D2D communication pairs 2A-2C. The D2D communication pair 2A includes a transmitting terminal (UE) 1A and a receiving terminal (UE) 1B. The D2D communication pair 2B includes a transmitting UE 1C and a receiving UE 1D. The D2D communication pair 2C includes a transmitting UE 1E and a receiving UE 1F. The transmitting UE 1A performs, for example, D2D transmission (sidelink transmission) to the UE 1B on a D2D link 101A. In a similar way, the transmitting UE 1C performs D2D transmission (sidelink transmission) to the UE 1D on a D2D link 101B, and the transmitting UE 1E performs D2D transmission (sidelink transmission) to the UE 1F on a D2D link 101C.

In the following description, when matters common to a plurality of UEs including the UEs 1A-1F are explained, they are simply referred to as the "UE 1" using a reference symbol "1". Similarly, when the matters common to a plurality of D2D communication pairs including the D2D communication pairs 2A-2C are explained, they are simply referred to as the "D2D communication pair 2" using a reference symbol "2". Meanwhile, when the matters common to a plurality of D2D links including the D2D links 101A-101C are explained, they are simply referred to as the "D2D link 101" using a reference symbol "101".

The UE 1 includes at least one radio transceiver and is configured to perform D2D communication with one or more other UEs 1 on one or more D2D links (e.g., D2D link 101A). As described above, the D2D link is referred to as a PC5 interface or a sidelink in the 3GPP. This D2D communication includes at least direct communication (i.e., ProSe Direct Communication) and may further include direct discovery (i.e., ProSe Direct Discovery). ProSe Direct Communication, which is direct communication using sidelink transmission, is also referred to as Sidelink Direct Communication. Similarly, ProSe Direct Discovery, which is direct discovery using sidelink transmission, is also referred to as Sidelink Direct Discovery. Further, the UE 1 is configured to perform cellular communication with a base station (i.e., eNB) 3 in cellular coverage (i.e., cell) 31 provided by the eNB 3.

The eNBs 3A and 3B are entities arranged in a radio access network (i.e., E-UTRAN). The eNB 3A is configured to provide cellular coverage 31A containing one or more cells and perform cellular communication with each UE 1 by using a cellular communication technology (e.g., E-UTRA technology). Similarly, the eNB 3B is configured to provide cellular coverage 31B and perform cellular communication with each UE 1 by using a cellular communication technology (e.g., E-UTRA technology). In the following description, when the matters common to a plurality of eNBs including the eNBs 3A and 3B are explained, they are simply referred to as the "eNB 3" using a reference symbol "3".

In this embodiment, scheduled resource allocation is employed to allocate radio resources to D2D transmission. That is, the eNB 3 communicates with a transmitting UE (e.g., UE 1A) in each D2D communication pair 2 and allocates radio resources for D2D transmission to the transmitting UE. Further, in some implementations, the eNB 3 may permit spatial reuse of D2D radio resources within the cell 31 of the eNB 3. For example, the eNB 3 may consider a proximity relationship (or neighbor relation) among D2D communication pairs 2 in the cell 31 of the eNB 3 and allocate radio resources to respective D2D transmissions performed by these D2D communication pairs 2 (or to respective transmitting UEs 1). More specifically, the base station 3 may allocate radio resources to a plurality of D2D transmissions performed in its cell 31 in accordance with an allocation rule that permits two D2D communication pairs 2 that are not in proximity to each other to spatially reuse an identical radio resource but prevents two D2D communication pairs 2 in proximity to each other from using an identical radio resource. These implementations contribute to enabling efficient spatial reuse of the D2D radio resources while preventing interference among D2D transmissions performed by D2D communication pairs 2 in proximity to each other.

Figure 2:
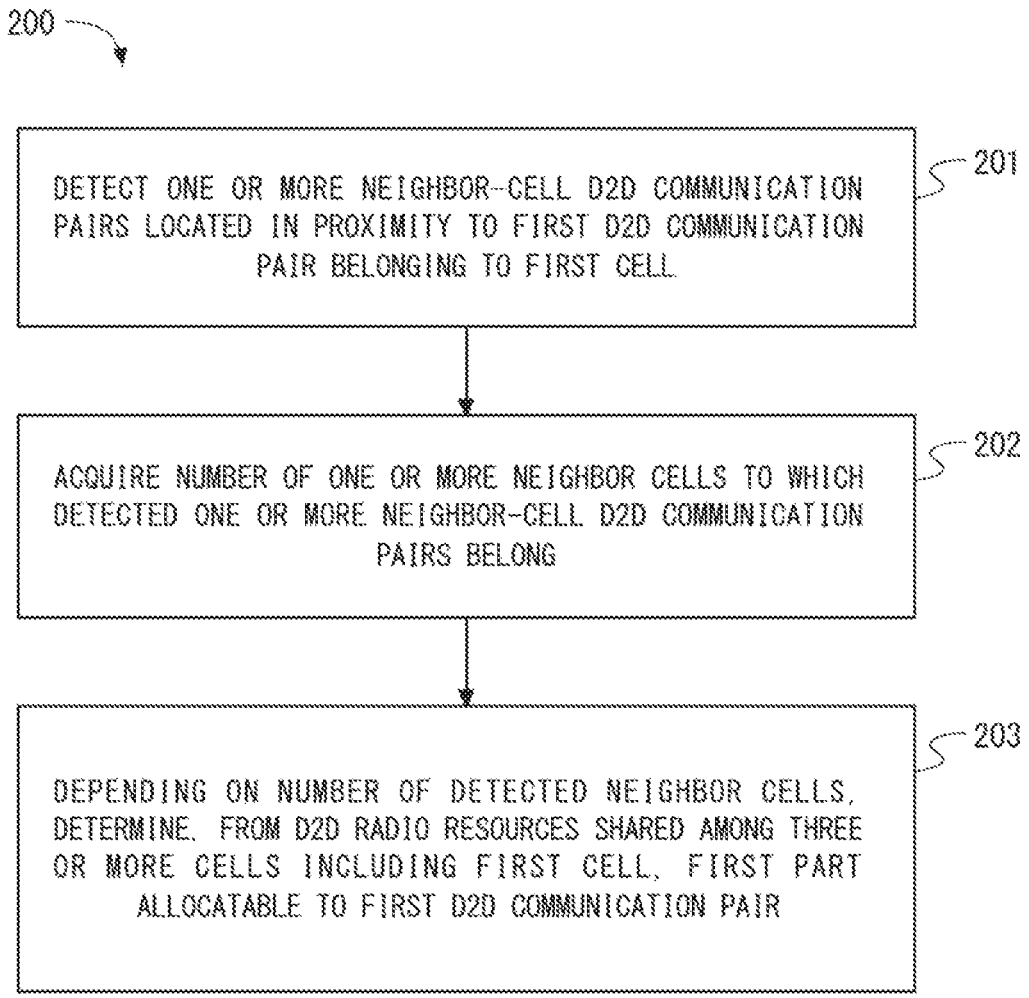
FIG. 2 is a flowchart showing one example of a method of determining resources that are allocatable to D2D transmission according to an embodiment.

Further, the eNB 3 according to this embodiment is configured to, when allocating D2D radio resources to D2D transmission of a D2D communication pair 2 (or transmitting UE) located within the coverage of its cell 31, consider whether this D2D communication pair 2 has a proximity relationship with a D2D communication pair 2 belonging to a neighbor cell. To be specific, the eNB 3 determines, from the D2D radio resources shared among three or more cells including its cell 31, a first part (or portion or section) allocatable to a first D2D communication pair belonging to its cell 31, depending on the number of one or more neighbor cells to which one or more neighbor-cell D2D communication pairs (or neighbor-cell D2D UE) located in proximity to the first D2D communication pair belong. The proximity between two D2D communication pairs may be proximity between the D2D transmitting UE (or D2D receiving UE) belonging to one D2D communication pair and the D2D transmitting UE (or D2D receiving UE) belonging to the other D2D communication pair. FIG. 2 is a flowchart showing a process 200 that is an example of the operation performed by the eNB 3. In Step 201, the eNB 3 detects one or more neighbor-cell D2D communication pairs (or D2D transmitting UEs or D2D receiving UEs) located in proximity to the first D2D communication pair belonging to the cell 31 of the eNB 3.

In one example, a proximity relationship between two D2D communication pairs may be evaluated based on whether the transmitting UE of one of the pairs is in proximity to the transmitting UE of the other pair. Alternatively, a proximity relationship between two D2D communication pairs may be evaluated based on whether the transmitting UE of one of the pairs is in proximity to the receiving UE of the other pair.

The eNB 3 may be configured to determine whether two D2D communication pairs 2 are in proximity to each other. In some implementations, the eNB 3 may use a result of detecting neighboring UEs reported from at least one UE 1 belonging to at least one of the two D2D communication pairs 2 in order to determine whether the two D2D communication pairs 2 are in proximity to each other.

The result of detecting neighboring UEs may indicate a UE that the UE 1 has discovered in the direct discovery procedure. The result of detecting neighboring UEs may include, for example, (a) an identifier of each of one or more neighboring UEs, (b) an identifier of each of one or more D2D communication pairs to which the one or more neighboring UEs belong, and (c) an identifier of an eNB or a cell with which each of the one or more neighboring UEs is associated. The result of detecting neighboring UEs may further include at least one of (d) received signal power of a signal (e.g., discovery signal) transmitted from each of the one or more neighboring UEs and (e) the number of times of detection of the one or more neighboring UEs. A signal (e.g., discovery signal or response signal) transmitted by the UE 1 in the direct discovery procedure may include (a) an identifier of itself (transmitting UE), (b) an identifier of one or more D2D communication pairs to which itself (transmitting UE) belongs, and (c) an identifier of an eNB or a cell with which itself (transmitting UE) is associated.

The UE 1 may report the result of detection of neighboring UEs to the eNB 3 periodically or aperiodically. For example, the UE 1 may transmit the result of detection of neighboring UEs to the eNB 3 when there is a change in the list of neighboring UEs.

In one example, the eNB 3 may determine that a D2D communication pair to which the UE 1 belongs and a D2D communication pair to which a neighboring UE detected by the UE 1 belongs are in proximity to each other (i.e., they are in a proximity relationship). In another example, the eNB 3 may evaluate a proximity level between two D2D communication pairs in multiple levels no less than three levels. In such a case, the eNB 3 may determine the proximity level between the two D2D communication pairs based on received signal power of a signal (e.g., discovery signal) transmitted from the neighboring UE measured by the UE 1.

Alternatively, in some implementations, the eNB 3 may use location information of the UE 1 of each D2D communication pair 2 in order to determine whether two D2D communication pairs 2 are in proximity to each other. The location information of the UE 1 explicitly or implicitly indicates a geographic location of the UE 1. The location information of the UE 1 may include GNSS location information obtained by a Global Navigation Satellite System (GNSS) receiver. The GNSS location information indicates latitude and longitude. Additionally or alternatively, the location information of the UE 1 may include Radio Frequency (RF) fingerprints. The RF fingerprints include information about neighbor cell measurements (e.g., cell ID and Reference Signal Received Power (RSRP)) measured by the UE 1.

The eNB 3 may receive directly from the UE 1 its location information or may receive it through a server. For example, the eNB 3 may use the location information of the UE 1 that is acquired by using a network-level discovery procedure. The network-level discovery procedure is, for example, EPC-level ProSe Discovery. In EPC-level ProSe Discovery, UEs intermittently transmit to a network their location information by which the position of these UEs can be estimated and the network (i.e., ProSe function entity) determines proximity between the UEs based on the location information received from them. Alternatively, the eNB 3 may use location information included in Logged Minimization of Drive Tests (MDT) measurement data obtained by the MDT function of the UE 1.

In one example, when a geographic distance between two UEs 1 derived from their location information is shorter than a predetermined threshold, the eNB 3 may determine that two D2D communication pairs 2 to which these two UEs 1 respectively belong are in proximity to each other (i.e., the pairs are in a proximity relationship). In another example, the eNB 3 may evaluate a proximity level between two D2D communication pairs in multiple levels no less than three levels. In such a case, the eNB 3 may determine a proximity level between two D2D communication pairs based on a geographic distance between two UEs 1 derived from their location information.

In Step 202, the eNB 3 acquires the number of one or more neighbor cells to which the acquired one or more neighbor-cell D2D communication pairs belong. In Step 203, the eNB 3 determines, from the D2D radio resources shared among three or more cells including its cell 31, the first part allocatable to the first D2D communication pair, depending on the number of the detected one or more neighbor cells. In other words, depending on the number of neighbor cells to which neighbor-cell D2D communication pairs located in proximity to each D2D communication pair 2 belong, the eNB 3 dynamically increases or decreases the size of the resource part, which is allocatable to the D2D communication pair 2, within the D2D radio resources shared among three or more neighbor cells.

Prior to describing specific examples of resource allocation in accordance with the method of determining the resources allocatable to D2D transmission according to this embodiment, a sidelink control period, a resource pool for PSCCH, and a resource pool for PSSCH for 3GPP Prose will be described. These are needed to determine radio resources (i.e., subframes and resource blocks) for transmitting a PSCCH and radio resources for transmitting a PSSCH. As described above, the PSCCH is a sidelink physical channel used for transmission of Sidelink Control Information (SCI), such as scheduling assignment information. On the other hand, the PSSCH is a sidelink physical channel used for user data transmission (direct transmission).

Figure 3:
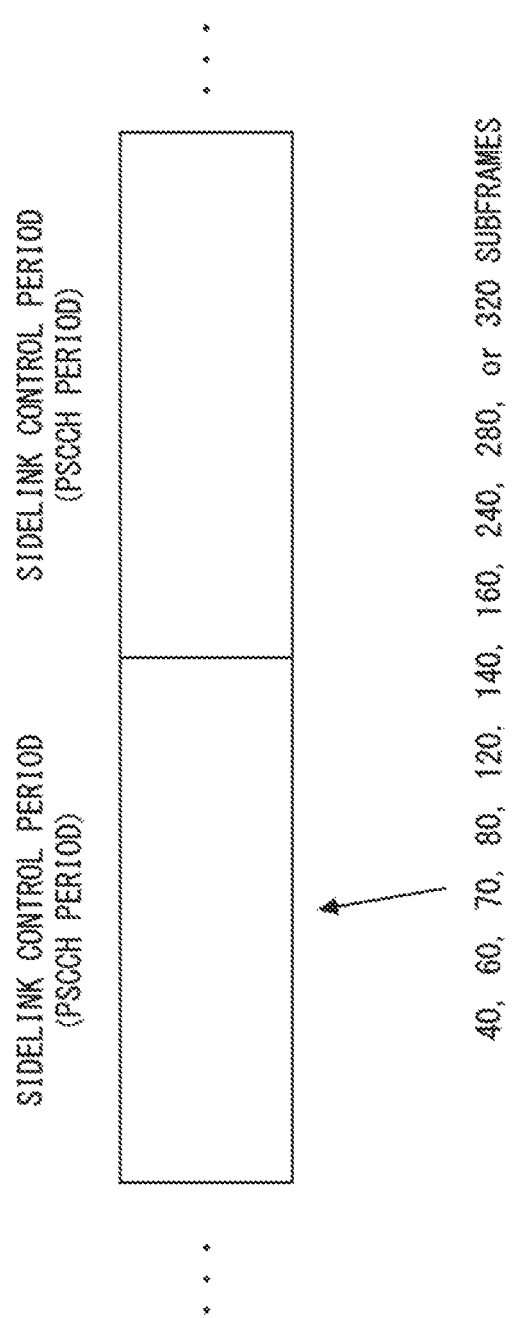
FIG. 3 is a diagram showing a PSCCH period (sidelink control period)

The sidelink control period is a scheduling period for sidelink (see FIG. 3). The sidelink control period is also referred to as a PSCCH period. The sidelink control period may also be referred to as a D2D scheduling period. The transmitting UE transmits scheduling assignment information (i.e., SCI format 0) in each sidelink control period. In 3GPP Release 12, the sidelink control period is 40 milliseconds (ms), 60 ms, 70 ms, 80 ms, 120 ms, 140 ms, 160 ms, 240 ms, 280 ms, or 320 ms. In other words, the sidelink control period is 40 subframes, 60 subframes, 70 subframes, 80 subframes, 120 subframes, 140 subframes, 160 subframes, 240 subframes, 280 subframes, or 320 subframes.

Figure 4:
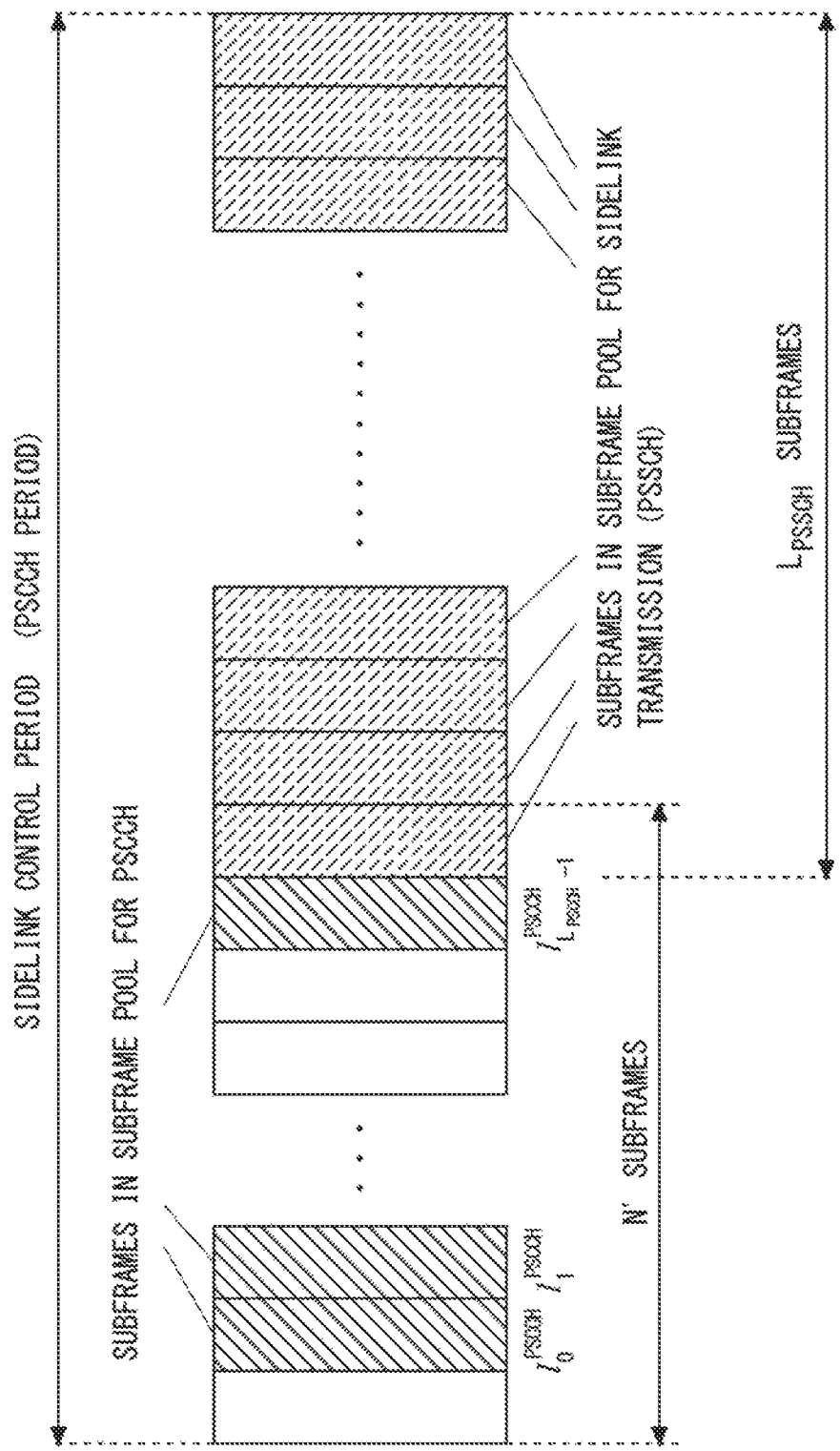
FIG. 4 is a diagram showing one example of a PSCCH subframe pool and a PSSCH subframe pool in a PSCCH period.

The PSCCH resource pool and the PSSCH resource pool are described hereinafter. The resource pool for PSCCH consists of a subframe pool and a resource block pool. FIG. 4 shows a subframe pool for PSCCH.

The eNB specifies the length (P) of the sidelink control period (PSCCH period) and specifies a subframe bitmap for PSCCH and its length (N'), in order to specify the subframe pool for PSCCH. The length (N') of the subframe bitmap is 4, 8, 12, 16, 30, 40, or 42 bits. As shown in FIG. 4, the N' subframes corresponding to the subframe bitmap are the first N' subframes within the sidelink control period. The subframe bitmap indicates that a subframe corresponding to a bit that is set to "0" is not used for PSCCH transmission and indicates that a subframe corresponding to a bit that is set to "1" can be used for PSCCH transmission. Accordingly, the number of subframes ($L_{PSCCH}$) contained in the PSCCH resource pool in one sidelink control period is equal to the number of bits that are set to "1" within the subframe bitmap. The subframes contained in the PSCCH resource pool (i.e., subframe pool) can be represented as follows: $(l_0^{PSCCH}, l_1^{PSCCH}, K, L_{L_{PSCCH}-1}^{PSCCH})$.

The method for specifying the resource pool for PSSCH is described hereinafter. In the case of scheduled resource allocation (i.e., sidelink transmission mode 1), the eNB specifies a subframe pool for PSSCH via SIB 18 or dedicated signaling (RRC signaling). The sidelink control period (PSCCH period), which is associated with the PSCCH resource configuration, is also associated with the PSSCH resource configuration. The UE determines the PSSCH resource pool consisting of a subframe pool as follows. Specifically, as shown in FIG. 4, in the sidelink control period (PSCCH period), subframes each having a subframe index equal to or larger than $1^{SPCCH}\{L_{PSCCH}-1\}+1$ belong to the subframe pool for PSSCH.

Note that, however, the allocation of PSSCH resources is specified for every 6, 7, or 8 subframes (i.e., 6, 7, or 8 ms) with the time resource pattern index. Accordingly, the same allocation of PSSCH resources is used for every 6, 7, or 8 subframes during one sidelink control period. In the case of Frequency division duplex (FDD), the period of allocation of PSSCH resources (i.e., time resource pattern) is 8 subframes. Meanwhile, in the case of TDD, the period of allocation of PSSCH resources (i.e., time resource pattern) is set to 6, 7, or 8 subframes depending on the TDD UL/DL configuration. As described above, the eNB sends an SL grant including the time resource pattern index to the transmitting UE. The SL grant is defined as Downlink Control Information (DCI) format 5.

Figure 5:
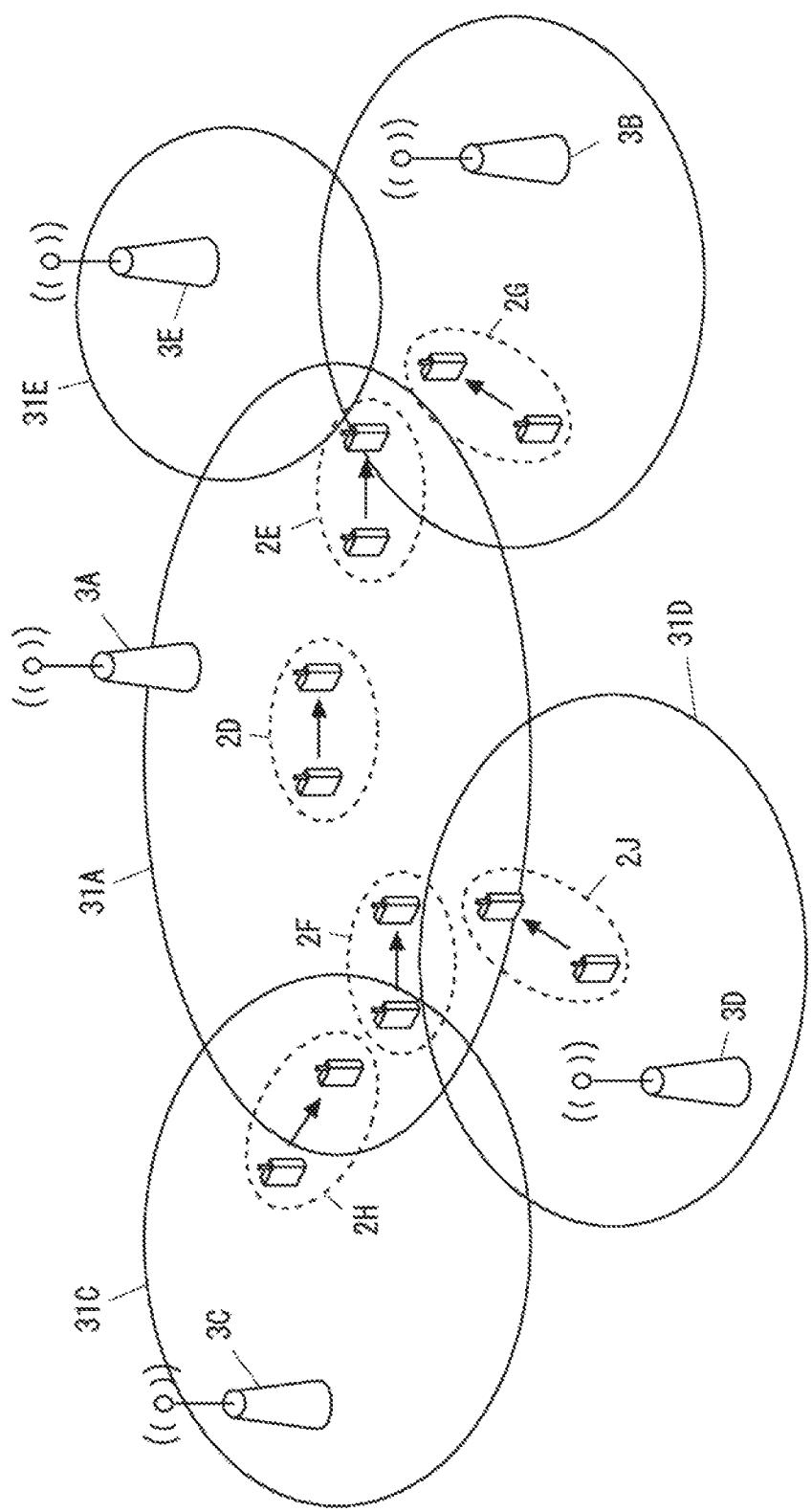
FIG. 5 is a diagram showing one example of a proximity relationship of D2D communication pairs for describing one example of a method of determining resources allocatable to D2D transmission according to an embodiment.

FIG. 5 is a diagram showing one example of the proximity relationship of a plurality of D2D communication pairs. In the example shown in FIG. 5, the D2D communication pairs 2D, 2E, and 2F belong to the cell 31A served by the eNB 3A. The D2D communication pair 2G belongs to the cell 31B served by the eNB 3B. The D2D communication pair 2H belongs to the cell 31C served by the eNB 3C. The D2D communication pair 2J belongs to the cell 31D served by the eNB 3D.

Further, in the example shown in FIG. 5, the D2D communication pair 2D has no proximity relationship with any neighbor-cell D2D communication pair. Meanwhile, the D2D communication pair 2E has a proximity relationship with one neighbor-cell D2D communication pair 2G belonging to one neighbor cell 31B. Further, the D2D communication pair 2F has a proximity relationship with two neighbor-cell D2D communication pairs 2H and 2J, which belong to two different neighbor cells 31C and 31D.

The eNB 3A shown in FIG. 5 determines resources (i.e., the above-described first part) allocatable to each D2D communication pair 2 belonging to its cell 31, depending on the number of one or more neighbor cells (hereinafter referred to as N_NC) to which one or more neighbor-cell D2D communication pairs located in proximity to the D2D communication pair 2 belong. Accordingly, the eNB 3A shown in FIG. 5 determines different allocatable resources (i.e., the above-described first part) for the three D2D communication pairs 2D, 2E, and 2F belonging to the cell 31A.

Figure 6:
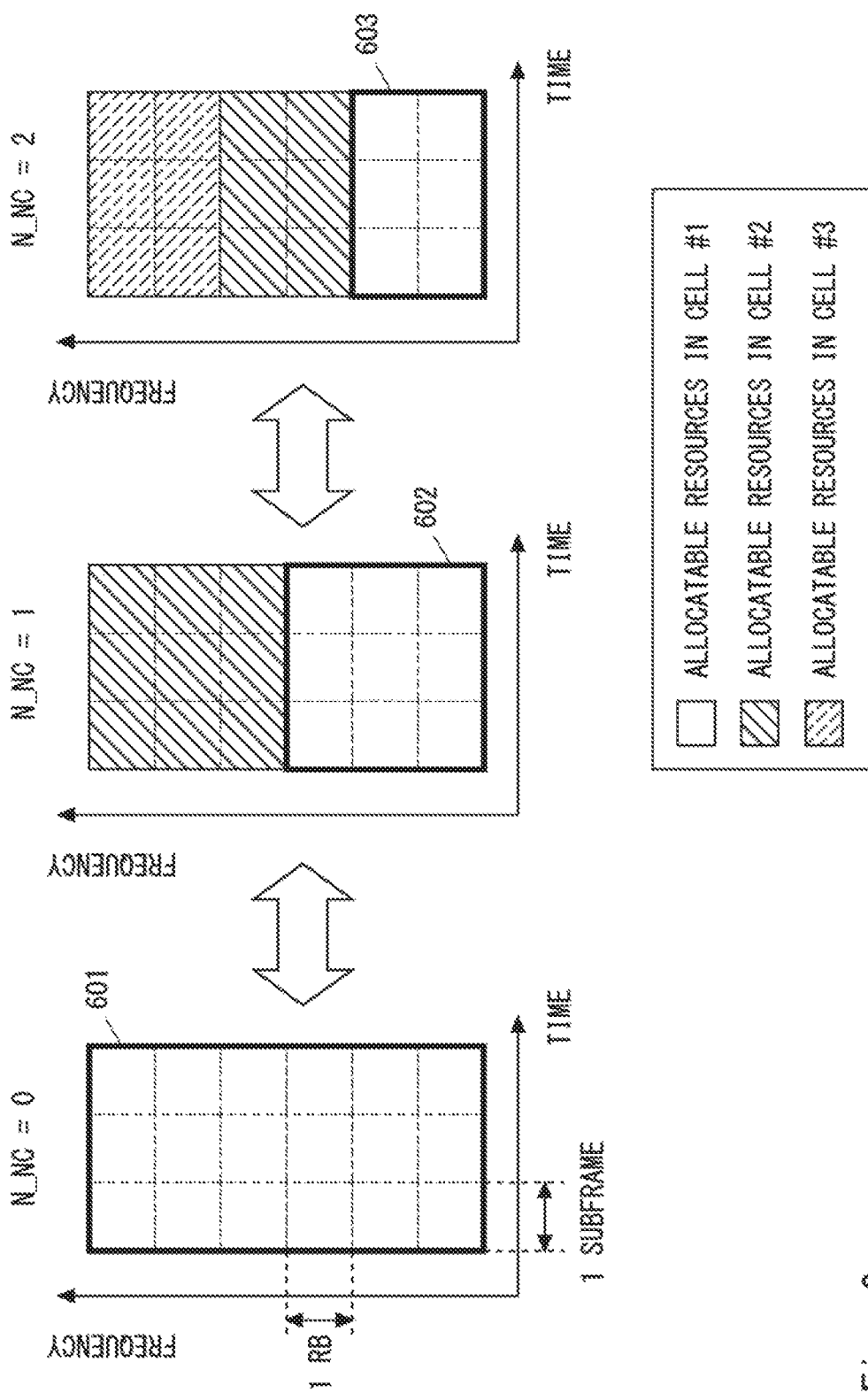
FIG. 6 is a diagram showing one example of dividing patterns of D2D radio resources shared among at least three cells adjacent to one another according to an embodiment.

FIG. 6 shows one example of dividing patterns of the D2D radio resources shared among three neighboring cells. FIG. 6 shows allocation of three subframes. This corresponds to a case in which the time resource pattern index specifies three subframes, among the 6, 7, or 8 subframes, for the PSSCH resources.

In the example shown in FIG. 6, when the number of the neighbor cells (N_NC) to which the one or more neighbor-cell D2D communication pairs, located in proximity to the D2D communication pair 2, belong is 0, the resource part (i.e., first part) allocatable to this D2D communication pair 2 is the whole part 601 of the D2D radio resources shared among three or more neighbor cells. On the other hand, when N_NC is 1, the resource part (i.e., first part) allocatable to this D2D communication pair 2 is a half part 602 of the shared D2D radio resources. Further, when N_NC is 2, the resource part (i.e., first part) allocatable to this D2D communication pair 2 is one-third 603 of the shared D2D radio resources. As shown in FIG. 6, the resource part allocatable to each D2D communication pair 2 may be referred to as priority resources. That is, in the example shown in FIG. 6, the eNB 3 decreases the size of the resource part allocatable to each D2D communication pair 2 as the number of the neighbor cells (N_NC) to which the one or more neighbor-cell D2D communication pairs located in proximity to this D2D communication pair 2 belong increases.

In other words, to determine the resource part to be allocatable to each D2D communication pair 2, the eNB 3 selects one of the dividing patterns based on the number of the neighbor cells (N_NC) to which the one or more neighbor-cell D2D communication pairs located in proximity to this D2D communication pair 2 belong. Each of the dividing patterns divides the D2D radio resources shared among at least three cells into a different number of parts.

In the case of the proximity relationship of the D2D communication pairs shown in FIG. 5, for example, the eNB 3A selects the whole part 601 of the D2D radio resources shared among at least three cells 31A, 31B, and 31C as the resource part (i.e., first part) allocatable to the D2D communication pair 2D. This is because the D2D communication pair 2D is not in proximity to any neighbor-cell D2D communication pair. On the other hand, the D2D communication pair 2E is in proximity to one neighbor-cell D2D communication pair 2G. Accordingly, the eNB 3A selects the half part 602 of the shared D2D radio resources as the resource part (i.e., first part) allocatable to the D2D communication pair 2E. Further, the D2D communication pair 2F has the proximity relationship with two neighbor-cell D2D communication pairs 2H and 2J, and these two neighbor-cell D2D communication pairs 2H and 2J belong respectively to different neighbor cells 31C and 31D. Accordingly, the eNB 3A selects the one-third 603 of the shared D2D radio resources as the resource part (i.e., first part) allocatable to the D2D communication pair 2F.

The three dividing patterns based on N_NC shown in FIG. 6 may be configured in advance in the eNB 3. In some implementations, these dividing patterns may be configured in the eNB 3 by a mobile operator. Alternatively, the eNB 3 may exchange control messages with the eNBs 3 serving the one or more neighbor cells in advance and may negotiate with them about these dividing patterns.

Figure 7:
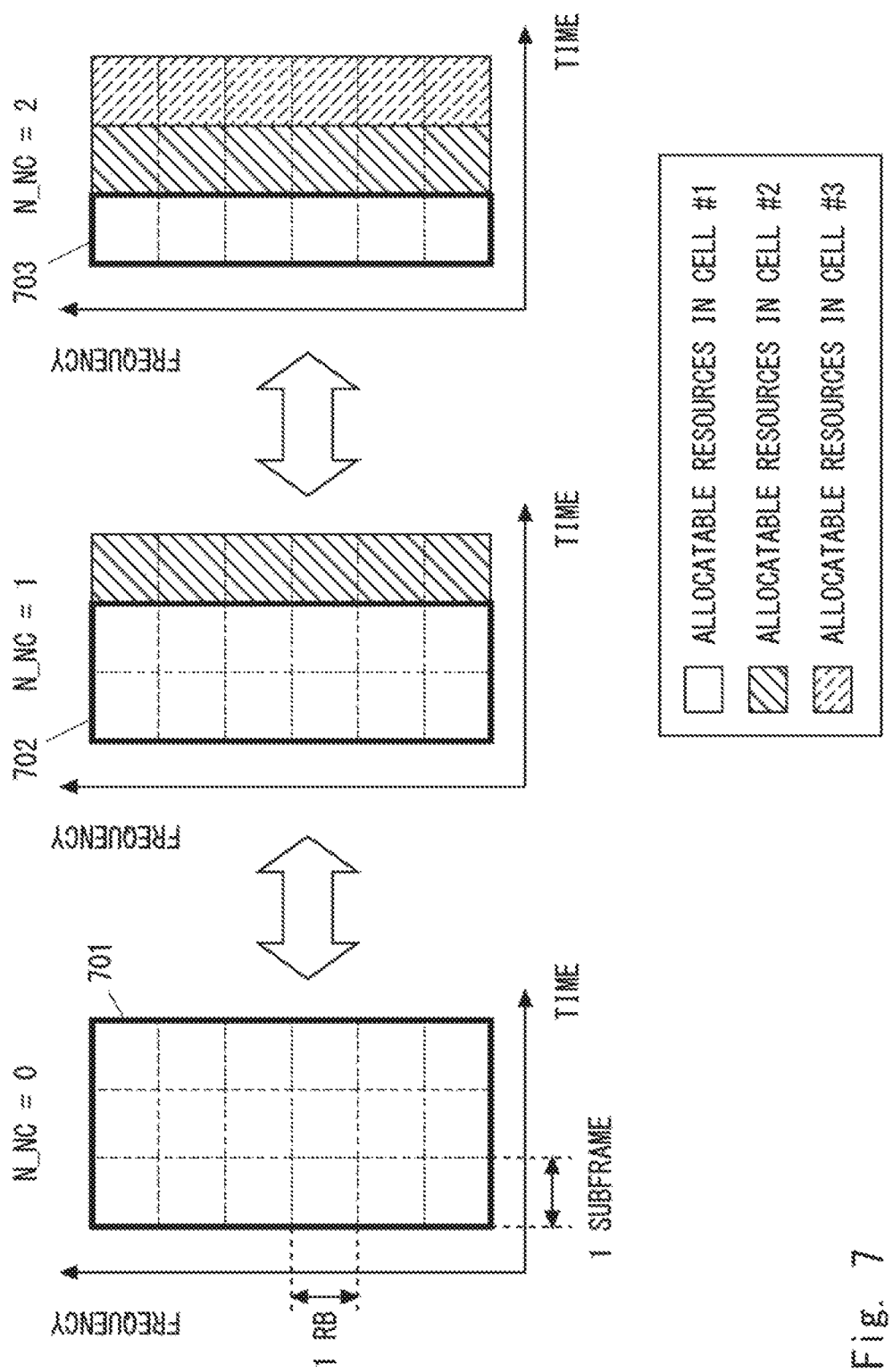
FIG. 7 is a diagram showing one example of dividing patterns of D2D radio resources shared among at least three cells adjacent to one another according to an embodiment.

The dividing patterns of the shared D2D radio resources shown in FIG. 6 are merely one example. For example, time division patterns as shown in FIG. 7 may be instead used. In the example shown in FIG. 7, when the number of the neighbor cells (N_NC) to which the one or more neighbor-cell D2D communication pairs located in proximity to the D2D communication pair 2 belong is 0, the resource part (i.e., first part) allocatable to this D2D communication pair 2 is the whole part 701 of the D2D radio resources shared among three or more neighbor cells. On the other hand, when N_NC is 1, the resource part (i.e., first part) allocatable to this D2D communication pair 2 is a part 702 of the shared D2D radio resources. Further, when N_NC is 2, the resource part (i.e., first part) allocatable to this D2D communication pair 2 is one-third 703 of the shared D2D radio resources.

In the example shown in FIG. 7, since the time length of the shared D2D radio resources is 3 subframes, the part 702 is not the half of the whole resource 701. In order to equally divide the shared D2D radio resources for two cells, the dividing pattern when N_NC is 1 may be periodically changed. In other words, the dividing pattern when N_NC is 1 may include a plurality of different dividing patterns that periodically alternate with each other.

Figure 8:
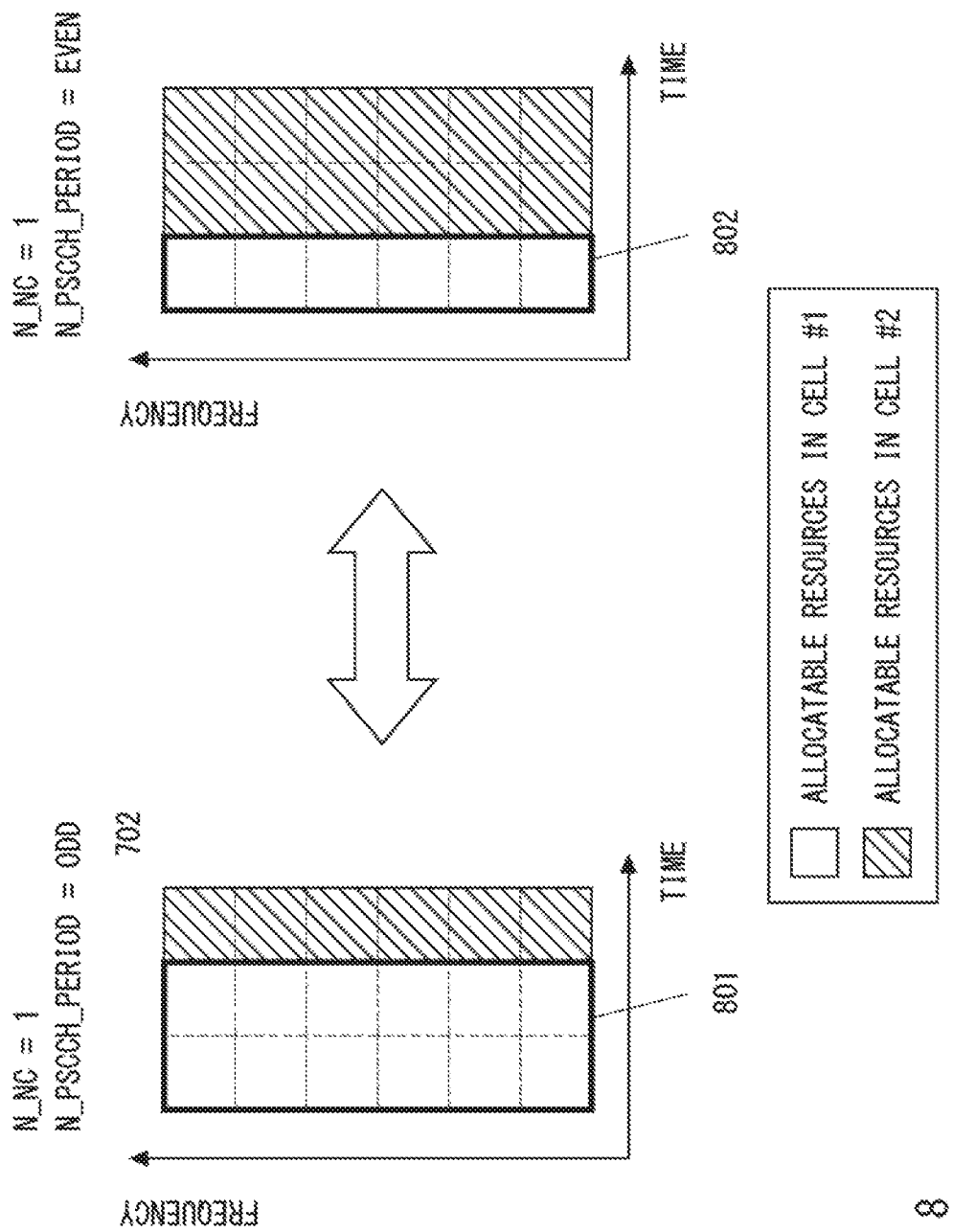
FIG. 8 is a diagram showing one example of a periodic change in dividing patterns according to an embodiment.

FIG. 8 shows one example of the periodic change between the dividing patterns. In the example shown in FIG. 8, the dividing pattern when N_NC is 1 is alternated between two dividing patterns every sidelink control period (PSCCH period). When the PSCCH period number (N_PSCCH_PERIOD) is an odd number, the eNB (e.g., eNB 3) serving the cell #1 (e.g., cell 31) selects the part 801 as the resource part (i.e., first part) allocatable to the D2D communication pair 2 (e.g., D2D communication pair 2E) having N_NC equal to 1, whereas it selects the part 802 when the PSCCH period number (N_PSCCH_PERIOD) is an even number.

Figure 9:
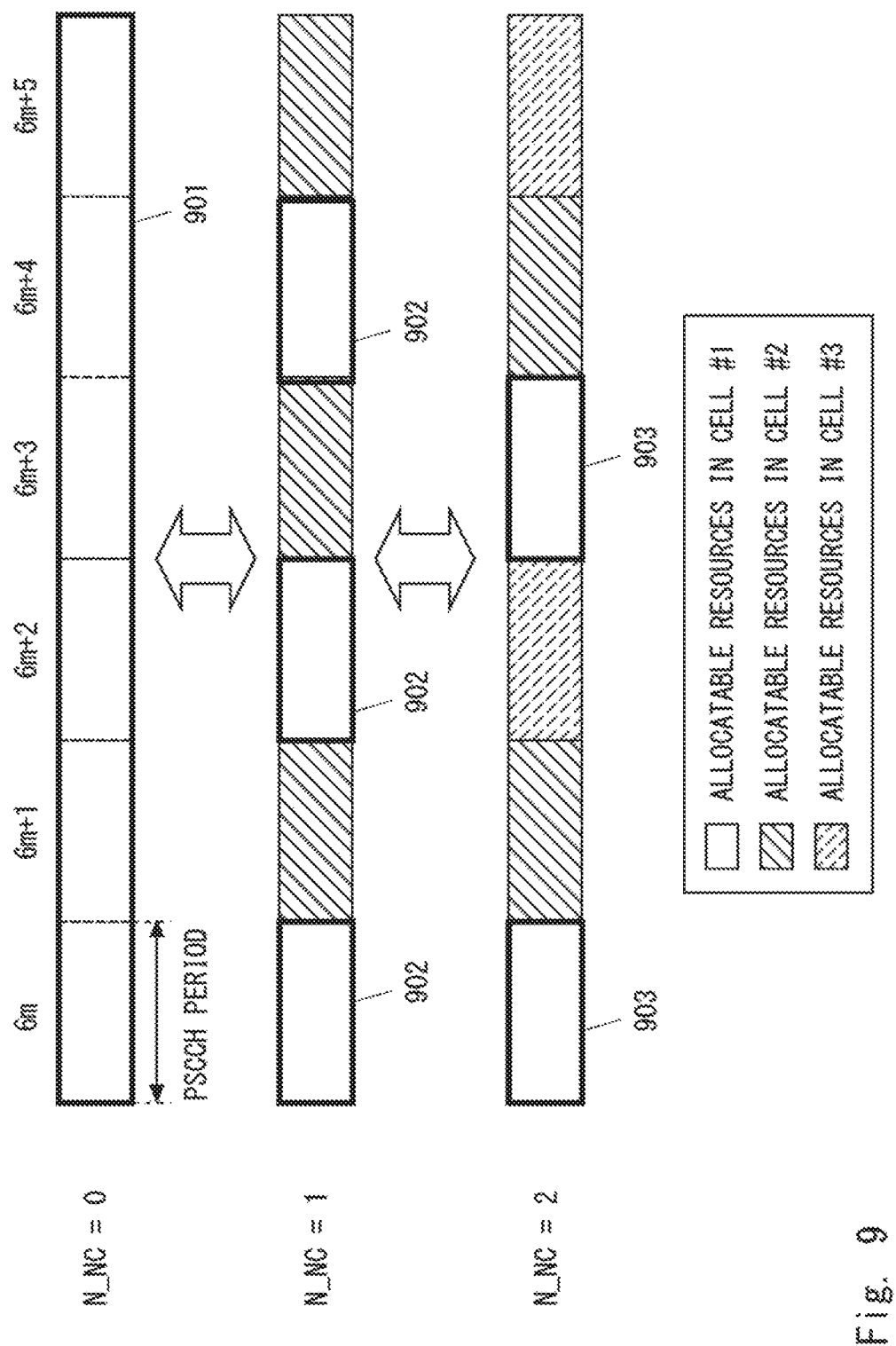
FIG. 9 is a diagram showing one example of a periodic change in the dividing patterns according to an embodiment.

FIG. 9 shows another example of the time division patterns. The time division patterns shown in FIG. 7 divide a set of subframes within the sidelink control period (PSCCH period) into one or more segments. In contrast, the time division patterns shown in FIG. 9 divide a set of sidelink control periods into one or more segments.

In the example shown in FIG. 9, the eNB 3 selects the resource part allocatable to each D2D communication pair 2 from six sidelink control periods 6m, 6m+1, ..., and 6m+5 (m is an integer). When the number of neighbor cells (N_NC) to which the one or more neighbor-cell D2D communication pairs located in proximity to the D2D communication pair 2 belong is 0, the resource part (i.e., first part) allocatable to this D2D communication pair 2 is the whole part 901 of the six sidelink control periods. On the other hand, when N_NC is 1, the resource part (i.e., first part) allocatable to this D2D communication pair 2 is three (i.e., part 902) of the six sidelink control periods. Further, when N_NC is 2, the resource part (i.e., first part) allocatable to this D2D communication pair 2 is two (i.e., part 903) of the six sidelink control periods.

As can be understood from the above description, the eNB 3 according to this embodiment determines, from the D2D radio resources shared among three or more cells, a first part (or portion or section) allocatable to a first D2D communication pair belonging to its cell 31, depending on the number of one or more neighbor cells to which one or more neighbor-cell D2D communication pairs (or neighbor-cell D2D UEs) located in proximity to the first D2D communication pair belong. In other words, the eNB 3 dynamically increases or decreases the size of the resource part allocatable to a D2D communication pair 2 within the D2D radio resources shared among three or more neighbor cells, depending on the number of neighbor cells to which neighbor-cell D2D communication pairs located in proximity to this D2D communication pair 2 belong.

According to the method of determining allocatable D2D resources according to this embodiment, for example, the eNB 3A shown in FIG. 5 determines resources allocatable to the D2D communication pair 2E belonging to the cell 31A of the eNB 3A by taking into account that the D2D communication pair 2E is in proximity to the D2D communication pair 2G belonging to the neighbor cell 31B but is not in proximity to any D2D communication pair belonging to the neighbor cell 31E. The eNB 3A shown in FIG. 5 is then able to select, for example, a larger number of radio resources as the resources allocatable to the D2D communication pair 2E without keeping priority resources for the neighbor cell 31E. The method of determining allocatable D2D resources according to this embodiment thus can contribute to enabling efficient use of D2D radio resources shared among at least three cells adjacent to one another.

Second Embodiment

Figure 10:
FIG. 10 is a diagram showing one example of a proximity relationship of the D2D communication pairs for describing one example of a periodic change in the dividing patterns according to an embodiment.

This embodiment provides modification of the method of determining allocatable D2D resources described in the first embodiment. FIG. 10 shows one example of a proximity relationship among three D2D communication pairs belonging to different cells. Each of the bidirectional arrows shown in FIG. 10 indicates that both of the two D2D communication pairs have detected proximity of them. To be specific, the D2D communication pair #1 belonging to the cell #1 has detected proximity to the D2D communication pair #2 belonging to the cell #2, but it has not detected proximity to the D2D communication pair #3 belonging to the cell #3. The D2D communication pair #3 belonging to the cell #3 has detected proximity to the D2D communication pair #2 belonging to the cell #2, but it has not detected proximity to the D2D communication pair #1 belonging to the cell #1. Meanwhile, the D2D communication pair #2 belonging to the cell #2 has detected proximity to the D2D communication pair #1 belonging to the cell #1 and proximity to the D2D communication pair #3 belonging to the cell #3.

If the D2D communication pair #1 is actually in proximity to the D2D communication pair #3 so that D2D communication signals of one pair reach the other pair in the example shown in FIG. 10, the use of many D2D resources by the D2D communication pair #1 without keeping the priority resources for the cell #3 causes interference between the cell #1 and the cell #3 in D2D communication. Similarly, the use of many D2D resources by the D2D communication pair #3 without keeping the priority resources for the cell #1 also causes interference between the cell #1 and the cell #3 in D2D communication.

Figure 11:
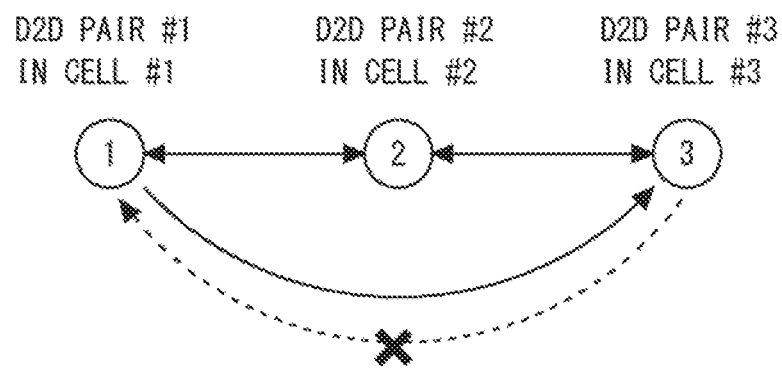
FIG. 11 is a diagram showing one example of a proximity relationship of the D2D communication pairs for describing one example of a periodic change in the dividing patterns according to an embodiment.

Further, the detections of the proximity relationship are not always mutual. For example, as shown in FIG. 11, a situation in which the D2D communication pair #1 belonging to the cell #1 has detected proximity to the D2D communication pair #3 belonging to the cell #3 but the D2D communication pair #3 belonging to the cell #3 has not yet detected proximity to the D2D communication pair #1 belonging to the cell #1 may occur. The unidirectional solid arrow shown in FIG. 11 indicates that the D2D communication pair #1 has detected proximity to the D2D communication pair #3. Meanwhile, the unidirectional dashed arrow shown in FIG. 11 indicates that the D2D communication pair #3 is not aware of the proximity to the D2D communication pair #1. In the example shown in FIG. 11, the use of many D2D resources by the D2D communication pair #3 without keeping the priority resources for the cell #1 causes interference between the cell #1 and the cell #3 in D2D communication.

In order to reduce interference of D2D communication between the cell #1 and the cell #3 in the situation shown in FIGS. 10 and 11, each eNB 3 may select a resource part, allocatable to the D2D communication pair 2 belonging to its cell 31, from the shared D2D radio resources as follows.

(1) The eNB 3 serving the cell #1 sets the subframe #1 as a default subframe for the cell #1. Similarly, the eNB 3 serving the cell #2 sets the subframe #2 as a default subframe for the cell #2, while the eNB 3 serving the cell #3 sets the subframe #3 as a default subframe for the cell #3.

(2) The eNB 3 serving the cell #1 selects all the three subframes #1, #2, and #3 as the resource part allocatable to the D2D communication pair #1 when the number of neighbor-cell D2D communication pairs located in proximity to the D2D communication pair #1 is zero.

(3) The eNB 3 serving #1 selects only the default subframe for the cell #1 (i.e., the subframe #1) as the resource part allocatable to the D2D communication pair #1 when it detects that both the D2D communication pair #2 belonging to the cell #2 and the D2D communication pair #3 belonging to the cell #3 are located in proximity to the D2D communication pair #1.

(4) The eNB 3 serving the cell #1 selects the default subframe for the cell #1 (i.e., subframe #1) and the default subframe for the cell #3 (i.e., subframe #3) as the resource part allocatable to the D2D communication pair #1 when it detects proximity of the D2D communication pair #1 to the D2D communication pair #2 belonging to the cell #2 but does not detect proximity of the D2D communication pair #1 to the D2D communication pair #3 belonging to the cell #3. However, the default subframe for the cell #3 (i.e., subframe #3) is intermittently used as allocatable resources for the D2D communication pair #1. For example, the default subframe for the cell #3 (i.e., subframe #3) may be alternately used by the D2D communication pairs #1 and #2 respectively belonging to the cells #1 and #2.

Figure 12A:
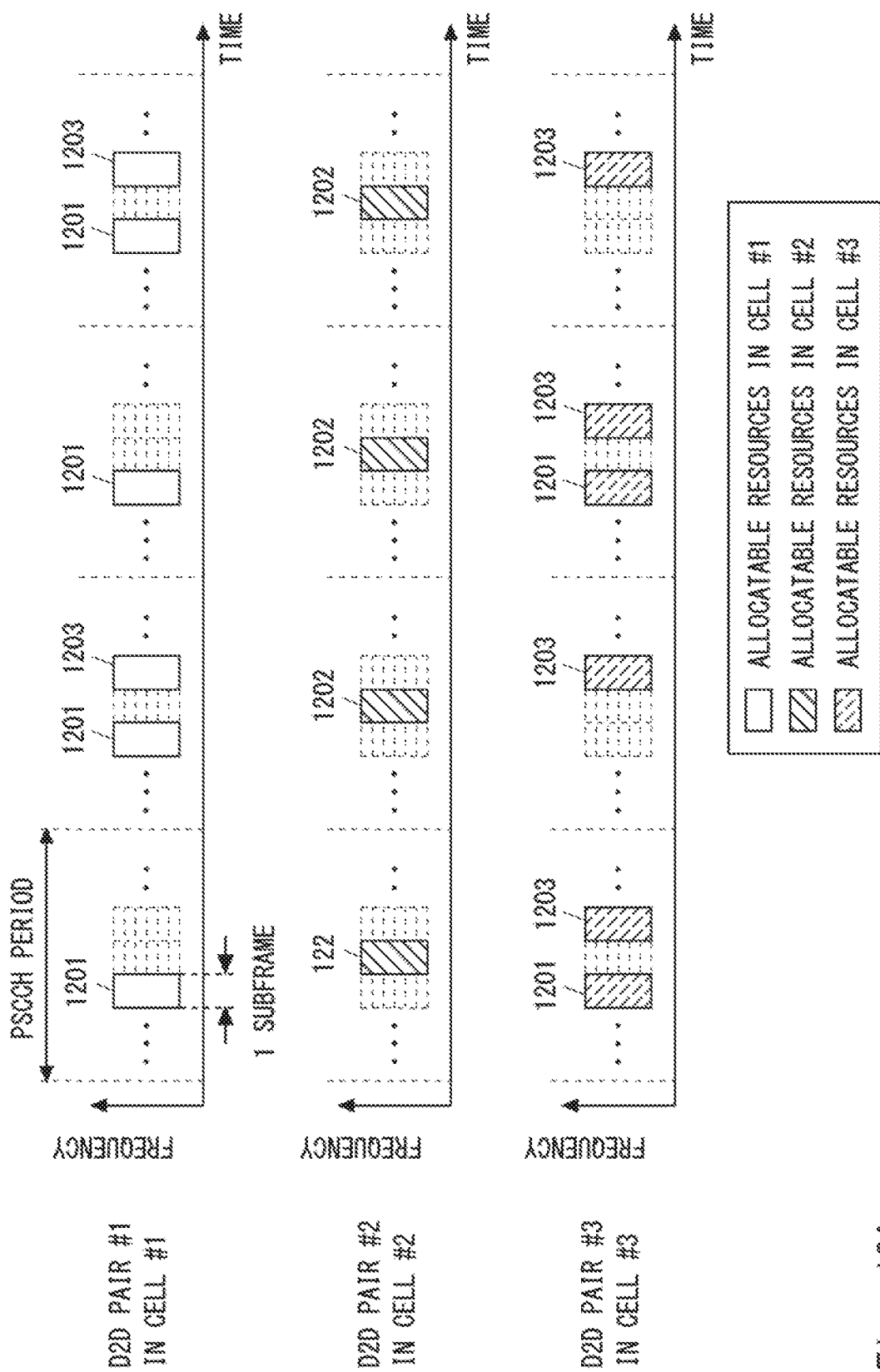
FIG. 12A is a diagram showing one example of a periodic change in the dividing patterns according to an embodiment.

FIG. 12A shows one example of subframe(s) allocatable to the three D2D communication pairs #1, #2, and #3 with regard to the proximity relationship shown in FIG. 10. The subframes 1201, 1202, and 1203 shown in FIG. 12A correspond to the aforementioned subframes #1, #2, and #3, respectively. In the example shown in FIG. 12A, the D2D communication pair #1 uses the default subframe #3 for the cell #3 (1203) every other sidelink control period. Similarly, the D2D communication pair #3 uses the default subframe #1 for the cell #1 (1201) every other sidelink control period. Since the D2D communication pair #2 is in proximity to both the D2D communication pairs #1 and #3, the D2D communication pair #2 uses only the default subframe #2 for the cell #2 (1202).

According to the resource allocation shown in FIG. 12A, even if the D2D communication pair #1 and the D2D communication pair #3 are actually in proximity to each other so that D2D communication signals of one pair reach the other pair, interference between the cell #1 and the cell #3 in D2D communication can be reduced.

Further, in the resource allocation shown in FIG. 12A, a plurality of cells adjacent to each other (e.g., the cells #1, #2, and #3) are configured with different respective default subframes, and the eNB 3 of each cell performs D2D resource allocation in consideration of the default subframes for these cells. Accordingly, the eNB 3 is able to avoid interference between adjacent D2D communication pairs without being aware of neighbor-cell D2D communication pairs of another D2D communication pairs that are in proximity to the D2D communication pair of its own cell.

Figure 12B:
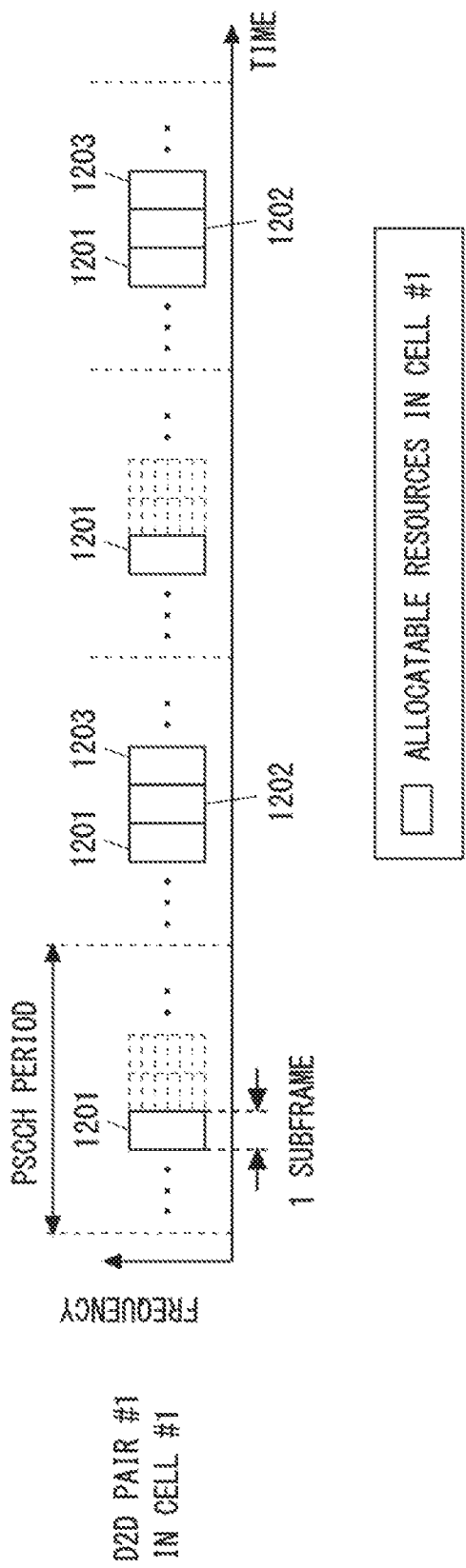
FIG. 12B is a diagram showing one example of a periodic change in the dividing patterns according to an embodiment.

Not that, also when the number of neighbor-cell D2D communication pairs located in proximity to a D2D communication pair of its own cell is zero, the eNB 3 may intermittently select a default subframe for another cell as resources allocatable to this D2D communication pair of its own cell. To be specific, for example, even when the number of neighbor-cell D2D communication pairs detected regarding the D2D communication pair #1 is zero, the default subframes #2 and #3 for other cells may be intermittently allocatable to the D2D communication pair #1 as shown in FIG. 12B. In the example shown in FIG. 12B, the D2D communication pair #1 uses the default subframes #2 and #3 for the cells #2 and #3 (1202 and 1203) every other sidelink control period.

According to the resource allocation shown in FIG. 12B, even when the D2D communication pair #1 is actually located in proximity to the D2D communication pair #2 (or #3), interference between the cell #1 and the cell #2 (or #3) in D2D communication can be reduced.

Third Embodiment

Figure 13:
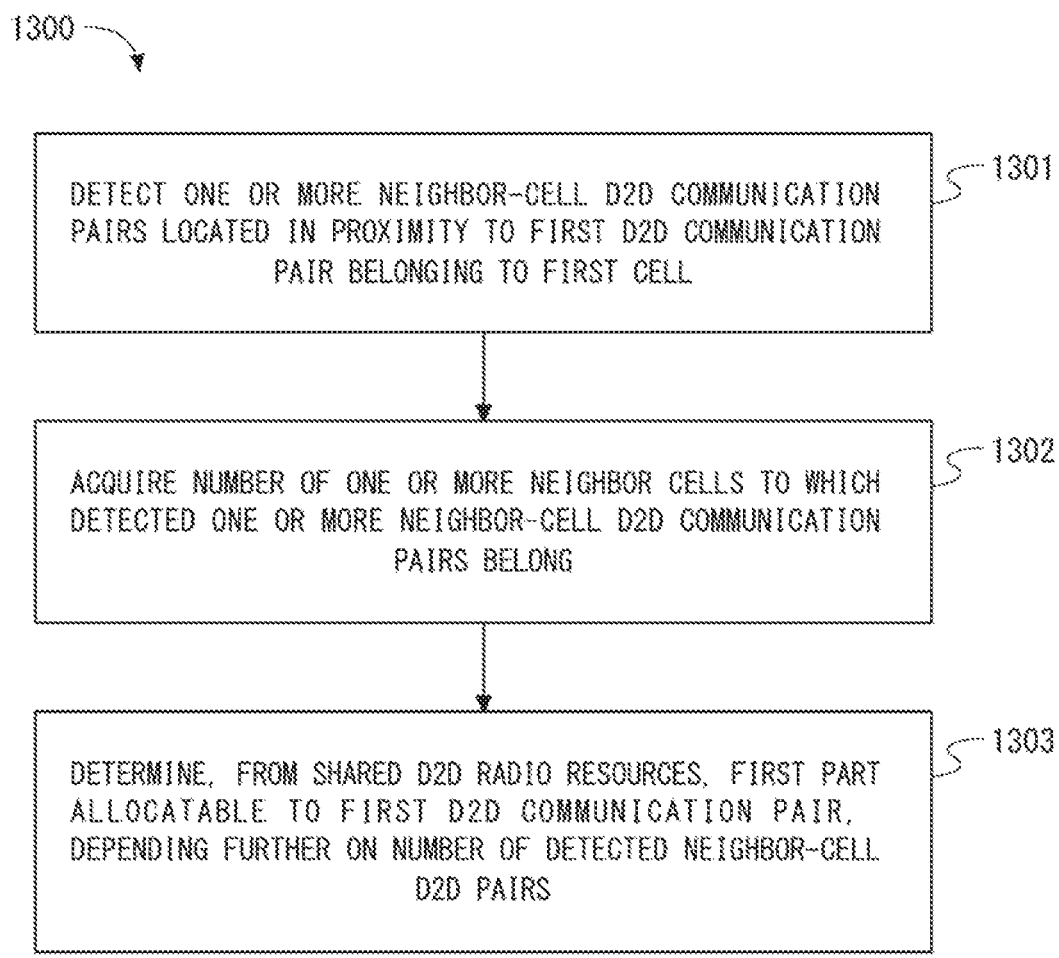
FIG. 13 is a flowchart showing one example of an operation of a base station according to an embodiment.

This embodiment provides modification of the method of determining allocatable D2D resources described in the first embodiment. FIG. 13 is a flowchart showing a process 1300 that is an example of the operation performed by the eNB 3. The processing in Steps 1301 and 1302 is similar to the processing in Steps 201 and 202 shown in FIG. 2. In Step 1303, the eNB 3 determines, from the D2D radio resources shared among three or more cells, the first part allocatable to the first D2D communication pair, depending further on the number of the detected neighbor-cell D2D pairs (or neighbor-cell D2D UEs).

For example, the eNB 3 may increase the size of the first part as the number of the detected neighbor-cell D2D pairs (or neighbor-cell D2D UEs) decreases. On the other hand, the eNB 3 may reduce the size of the first part as the number of the detected neighbor-cell D2D pairs (or neighbor-cell D2D UEs) increases. By doing this, the size of the resources that can be used increases in a neighbor cell where the number of D2D pairs is large, and accordingly the number of D2D communication pairs having low user throughput can be reduced.

Fourth Embodiment

Figure 14:
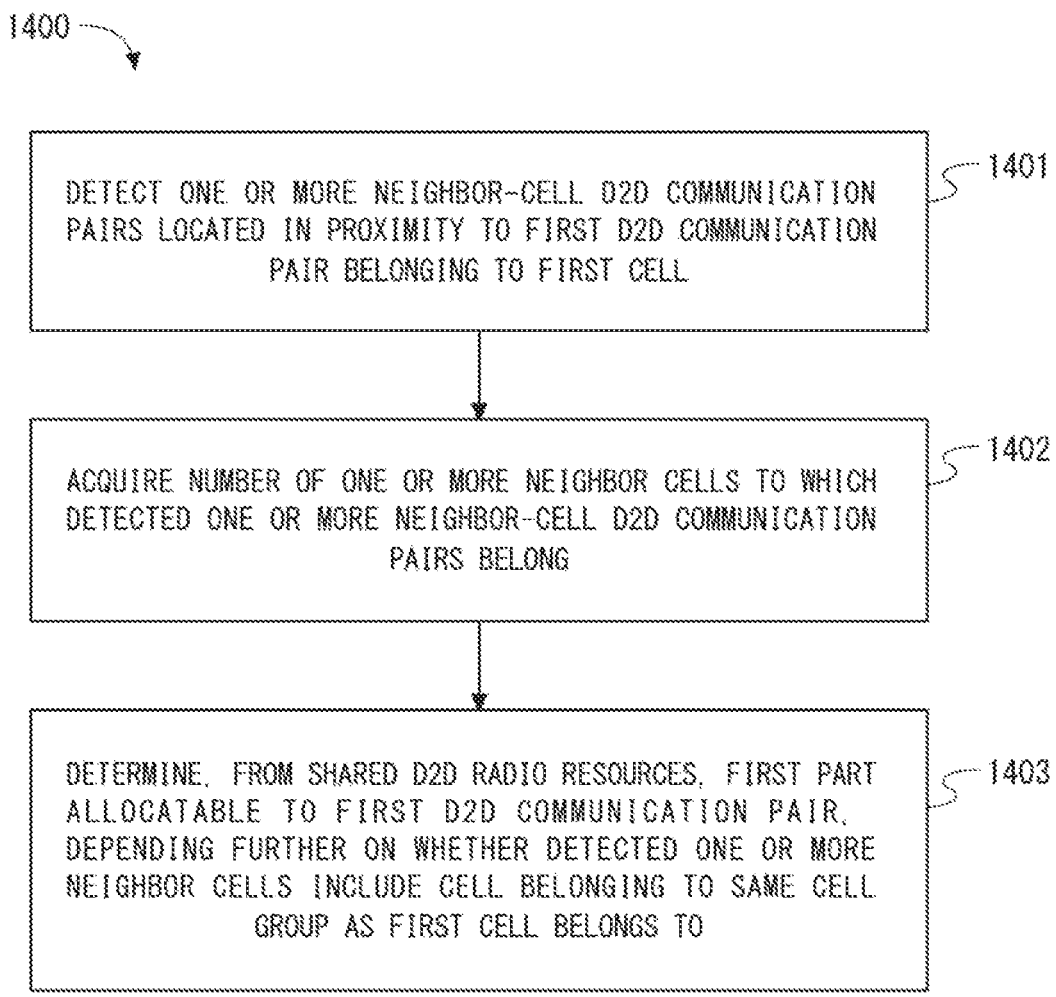
FIG. 14 is a flowchart showing one example of an operation of a base station according to an embodiment.

This embodiment provides modification of the method of determining allocatable D2D resources described in the first embodiment. FIG. 14 is a flowchart showing a process 1400 that is an example of the operation performed by the eNB 3. The processing in Steps 1401 and 1402 is similar to the processing in Steps 201 and 202 shown in FIG. 2. In Step 1403, the eNB 3 determines, from the D2D radio resources shared among three or more cells, the first part allocatable to the first D2D communication pair, depending further on whether the detected one or more neighbor cells include a cell belonging to the same cell group as the first cell belongs to. The cell group here means a group of cells that use the same set of dividing patterns of the shared D2D radio resources.

For example, when the eNB 3 has detected a D2D communication pair belonging to a neighbor cell belonging to the same cell group as its own cell belongs to, it divides the frequency domain or time domain of the resources of the first part may in order to further share the resources of the first part among the cells within the same group. It is thus possible to reduce interference among the cells within the same cell group in D2D communication.

Fifth Embodiment

Figure 15:
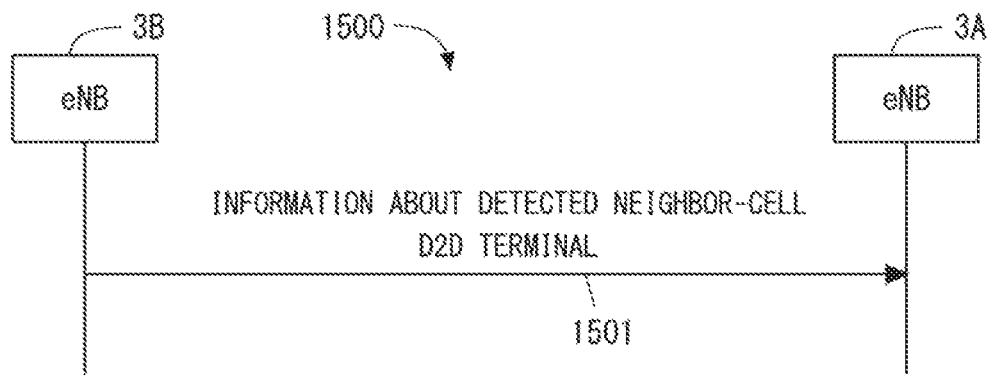
FIG. 15 is a flowchart showing one example of signaling between base stations according to an embodiment.

This embodiment provides enhancement or modification of signaling between the eNBs 3. FIG. 15 is a diagram showing a process 1500 that is one example of signaling between eNBs 3 according to this embodiment. In Step 1501, the eNB 3B sends information about detected neighbor-cell D2D terminal to the eNB 3A via an inter-eNB interface (e.g., X2 interface). This information may indicate whether proximity between a D2D communication pair belonging to the cell 31B of the eNB 3B and a D2D communication pair belonging to the cell 31A of the eNB 3A has been detected. This information may indicate an identifier of a D2D communication pair (or D2D UE) that belongs to the cell 31A and has been detected by the eNB 3B or a UE(s) 1 belonging to the cell 31B. This information may indicate an identifier of a D2D communication pair (or D2D UE) (e.g., Discoverer) that belongs to the cell 31B and has detected a D2D communication pair (or D2D UE) (e.g., Discoveree) belonging to the cell 31A. This information may indicate a proximity level between two D2D communication pairs, such as a received power level of a signal (e.g., discovery signal).

By using the procedure shown in FIG. 15, the eNB 3 is able to be aware of a proximity relationship of D2D communication pairs between neighbor cells more accurately. For example, the eNB 3 may determine, based on the information of Step 1501, whether it is needed to perform the resource allocation to avoid interference with undetected neighbor-cell D2D communication pairs, which has been described in the second embodiment.

Sixth Embodiment

Figure 16:
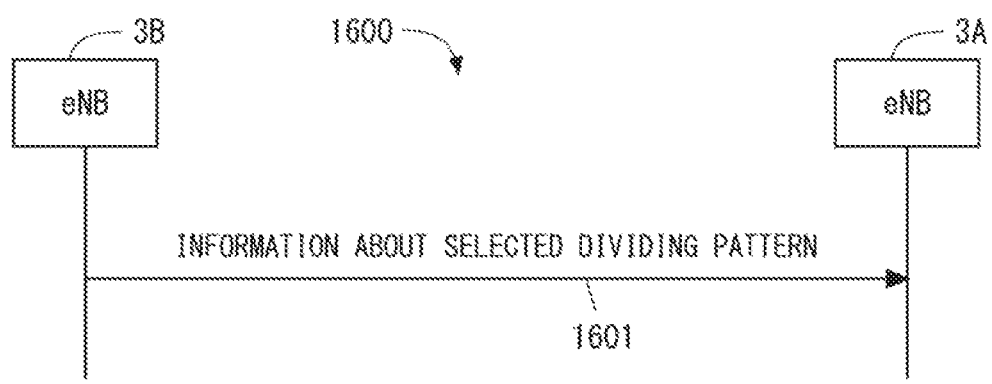
FIG. 16 is a flowchart showing one example of signaling between base stations according to an embodiment.

This embodiment provides enhancement or modification of signaling between the eNBs 3. FIG. 16 is a diagram showing a process 1600 that is one example of signaling between the eNBs 3 according to this embodiment. In Step 1601, the eNB 3B sends to the eNB 3A, via an inter-eNB interface (e.g., X2 interface), information indicating the dividing pattern selected based on the number of detected neighbor cells. Here, the dividing pattern is selected or determined according to any one of the methods of determining allocatable D2D resources described in the first to fourth embodiments.

By using the procedure shown in FIG. 16, the eNBs 3 are able to dynamically negotiate with each other about the dividing patterns of the D2D radio resources shared among at least three cells adjacent to one another.

Seventh Embodiment

This embodiment provides modification of the direct discovery. In the direct discovery procedure according to this embodiment, the UE 1 transmits to or receives from another UE(s) 1 a signal including an information element for identifying whether it is discovery for D2D communication or discovery for another purpose. The D2D communication here means the direct communication (e.g., ProSe direct communication, direct communication on the sidelink) excluding the direct discovery.

In accordance with a so-called announcement model (model A), the UE 1 operating as an announcing UE may transmit a discovery signal containing the above-described information element. A monitoring UE receives the discovery signal from the announcing UE, thereby detecting this monitoring UE.

Alternatively, in accordance with a so-called solicitation/ response model (model B), the UE 1 operating as a discoveree UE may transmit a response signal (response message) containing the above-described information element. A discoverer UE receives the response message from the discoveree UE, thereby discovering this discoveree UE.

By using the discovery procedure according to this embodiment, the UE 1 is able to distinguish discovered UE(s) that is performing the D2D communication or is planning to perform the D2D communication from the other discovered UE(s).

Figure 17:
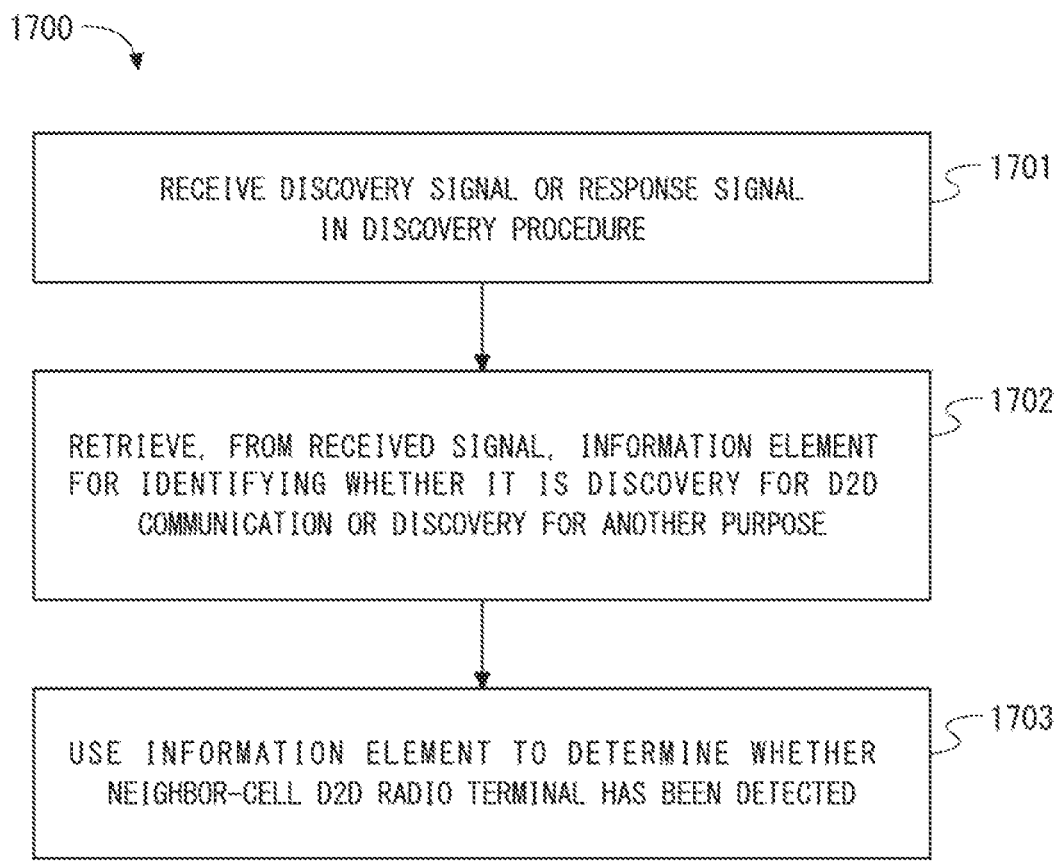
FIG. 17 is a flowchart showing one example of an operation of a radio terminal according to an embodiment.

FIG. 17 is a flowchart showing a process 1700 that is an example of the operation performed by the UE 1 according to this embodiment. In Step 1701, the UE 1 receives a discovery signal or a response signal in the discovery procedure. In Step 1702, the UE 1 retrieves, from the received signal, an information element for identifying whether it is discovery for D2D communication or discovery for another purpose. In Step 1703, the UE 1 uses the retrieved information element to determine whether a neighbor-cell D2D radio terminal has been detected.

Figure 18:
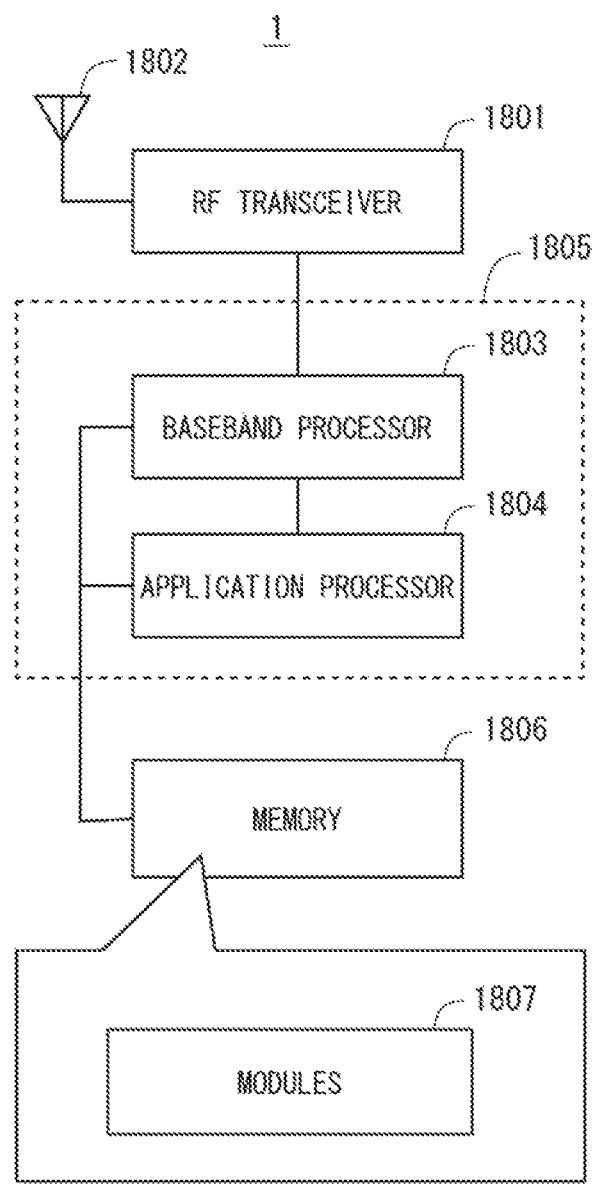
FIG. 18 is a block diagram showing a configuration example of a radio terminal according to embodiments.

In the following, configuration examples of the UE 1 and the eNB 3 according to the above embodiments will be described. FIG. 18 is a block diagram showing a configuration example of the UE 1. A Radio Frequency (RF) transceiver 1801 performs analog RF signal processing to communicate with the eNB 3. The analog RF signal processing performed by the RF transceiver 1801 includes frequency up-conversion, frequency down-conversion, and amplification. The RF transceiver 1801 is coupled to an antenna 1802 and a baseband processor 1803. Specifically, the RF transceiver 1801 receives modulated symbol data (or OFDM symbol data) from the baseband processor 1803, generates a transmission RF signal, and supplies the transmission RF signal to the antenna 1802. Further, the RF transceiver 1801 generates a baseband reception signal based on a reception RF signal received by the antenna 1802 and supplies the baseband reception signal to the baseband processor 1803.

The baseband processor 1803 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE or LTE-Advanced, the digital baseband signal processing performed by the baseband processor 1803 may include signal processing of Packet Data Convergence Protocol (PDCP) layer, Radio Link Control (RLC) layer, Medium Access Control (MAC) layer, and physical (PHY) layer. Meanwhile, the control-plane processing performed by the baseband processor 1803 may include processing of Non-Access Stratum (NAS) protocol, Radio Resource Control (RRC) protocol, and MAC Control Elements (CEs).

The baseband processor 1803 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control-plane processing. In this case, the protocol stack processor, which performs the control-plane processing, may be integrated with an application processor 1804 described in the following.

The application processor 1804 is also referred to as a CPU, an MPU, a microprocessor, or a processor core. The application processor 1804 may include a plurality of processors (processor cores). The application processor 1804 executes a system software program (Operating System (OS)) and various application programs (e.g., voice call application, WEB browser, mailer, camera operation application, and music player application) loaded from a memory 1806 or from another memory (not shown), thereby providing various functions of the UE 1.

In some implementations, as represented by a dashed line (1805) in FIG. 18, the baseband processor 1803 and the application processor 1804 may be integrated on a single chip. In other words, the baseband processor 1803 and the application processor 1804 may be implemented in a single System on Chip (SoC) device 1805. A SoC device may be referred to as a system Large Scale Integration (LSI) or a chipset.

The memory 1806 is a volatile memory, a nonvolatile memory, or a combination thereof. The memory 1806 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1806 may include, for example, an external memory device that can be accessed by the baseband processor 1803, the application processor 1804, and the SoC 1805. The memory 1806 may include an internal memory device that is integrated in the baseband processor 1803, the application processor 1804, or the SoC 1805. Further, the memory 1806 may include a memory in a Universal Integrated Circuit Card (UICC).

The memory 1806 may store one or more software modules (a computer programs) including instructions and data to perform processing by the UE 1 described in the above embodiments. In some implementations, the baseband processor 1803 or the application processor 1804 may be configured to load the software modules from the memory 1806 and execute the loaded software modules, thereby performing the processing of the UE 1 described in the above embodiments.

Figure 19:
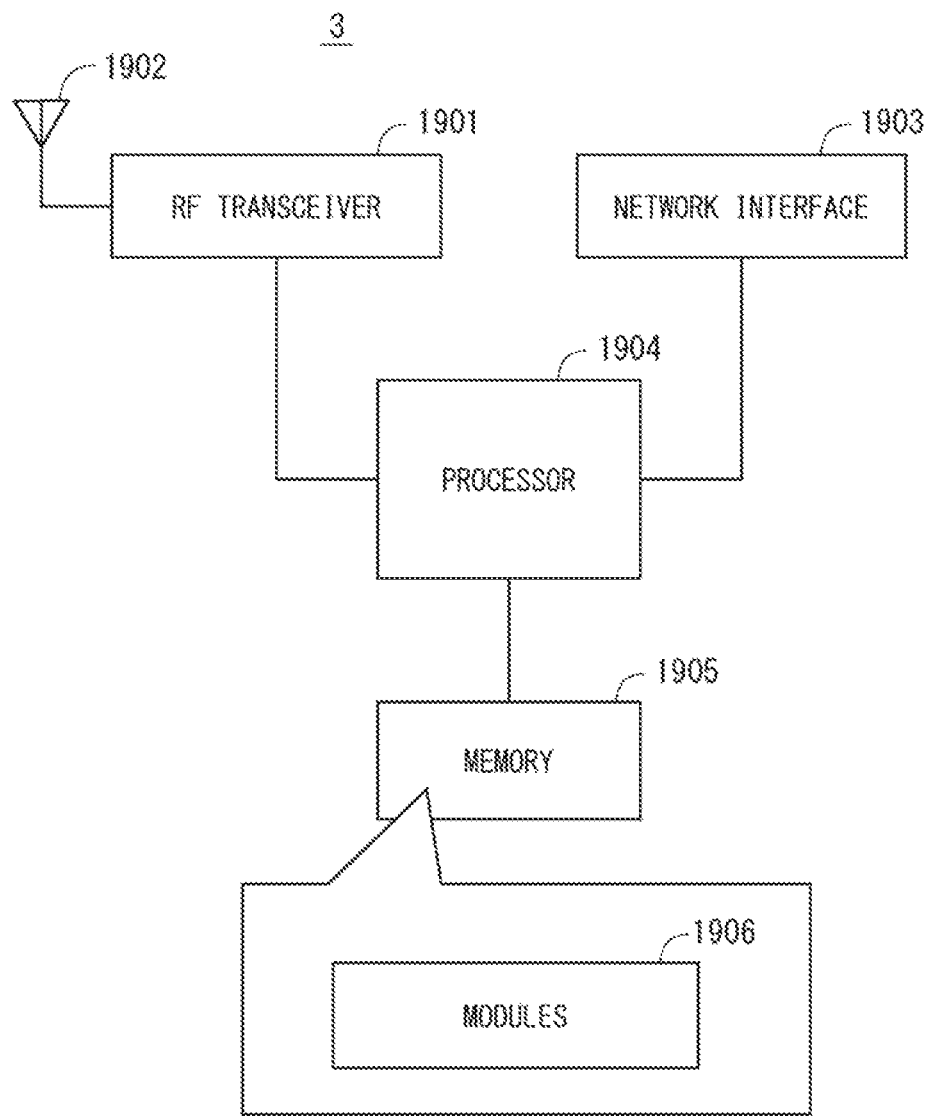
FIG. 19 is a block diagram showing a configuration example of a base station according to embodiments.

FIG. 19 is a block diagram showing a configuration example of the eNB 3 according to the above embodiments. Referring to FIG. 19, the eNB 3 includes an RF transceiver 1901, a network interface 1903, a processor 1904, and a memory 1905. The RF transceiver 1901 performs analog RF signal processing to communicate with the UE 1. The RF transceiver 1901 may include a plurality of transceivers. The RF transceiver 1901 is connected to an antenna 1902 and the processor 1904. The RF transceiver 1901 receives modulated symbol data (or OFDM symbol data) from the processor 1904, generates a transmission RF signal, and supplies the transmission RF signal to the antenna 1902. Further, the RF transceiver 1901 generates a baseband reception signal based on a reception RF signal received by the antenna 1902 and supplies this signal to the processor 1904.

The network interface 1903 is used to communicate with network nodes (e.g., Mobility Management Entity (MME) and Serving Gateway (S-GW)). The network interface 1903 may include, for example, a network interface card (NIC) conforming to the IEEE 802.3 series.

The processor 1904 performs digital baseband signal processing (i.e., data-plane processing) and control-plane processing for radio communication. For example, in the case of LTE and LTE-Advanced, the digital baseband signal processing performed by the processor 1904 may include signal processing of the PDCP layer, RLC layer, MAC layer, and PHY layer. Further, the control-plane processing performed by the processor 1904 may include processing of Si protocol, RRC protocol, and MAC CEs.

The processor 1904 may include a plurality of processors. For example, the processor 1904 may include a modem-processor (e.g., DSP) that performs the digital baseband signal processing, and a protocol-stack-processor (e.g., CPU or MPU) that performs the control-plane processing.

The memory 1905 is a volatile memory, a nonvolatile memory, or a combination thereof. The volatile memory is, for example, an SRAM, a DRAM, or a combination thereof. The nonvolatile memory is, for example, an MROM, a PROM, a flash memory, a hard disk drive, or any combination thereof. The memory 1905 may include a storage located apart from the processor 1904. In this case, the processor 1904 may access the memory 1905 through the network interface 1903 or an I/O interface (not shown).

The memory 1905 may store one or more software modules (computer programs) including instructions and data to perform processing by the eNB 3 described in the above embodiments. In some implementations, the processor 1904 may be configured to load the software modules from the memory 1905 and execute the loaded software modules, thereby performing the processing of the eNB 3 described in the above embodiments.

As described above with reference to FIGS. 18 and 19, each of the processors included in the UE 1 and the eNB 3 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

Each of the above embodiments may be used individually, or two or more of the embodiments may be appropriately combined with one another.

In the above embodiments, the eNB 3 may be configured to select radio resources to be allocatable to D2D transmission performed by the D2D communication pair belonging to the cell 31 of the eNB 3 from the first part of the shared D2D radio resources. Alternatively, the eNB 3 may assign the first part of the shared D2D radio resources to the UE 1

(D2D transmitting UE), and this UE 1 (D2D transmitting UE) may select radio resources to be used for D2D transmission from the assigned first part.

The above embodiments provide examples in which the scheduled resource allocation is employed for allocation of radio resources to D2D transmission. Alternatively, the autonomous resource selection may be used for allocation of radio resources to D2D transmission. In this case, the eNB 3 may determine a resource pool to be configured in the UE 1, by using any one of the methods of determining allocatable D2D resources described in the above embodiments. Alternatively, when the UE 1 autonomously selects resources for the sidelink control (PSCCH) or data (PSSCH) or both from the resource pool configured by the eNB 3, it may use any one of the methods of determining allocatable D2D resources described in the above embodiments.

Further, the above embodiments are merely examples of applications of the technical ideas obtained by the inventor. These technical ideas are not limited to the above embodiments and various modifications can be made thereto.

For example, the whole or part of the above embodiments can be described as, but not limited to, the following supplementary notes.

(Supplementary Note 1)
A processing apparatus comprising:
  at least one memory; and
  at least one processor coupled to the at least one memory and configured to:
    acquire a number of one or more neighbor cells to which one or more neighbor-cell D2D radio terminals, located in proximity to a first device-to-device (D2D) communication pair belonging to a first cell, belong; and
    depending on the number of the one or more neighbor cells, determine, from D2D radio resources that are shared among three or more cells including the first cell, a first part allocatable to the first D2D communication pair.

(Supplementary Note 2)
The processing apparatus according to Supplementary Note 1, wherein the at least one processor is configured to:
  detect the one or more neighbor-cell D2D radio terminals;
  detect the number of one or more neighbor cells to which the detected one or more neighbor-cell D2D radio terminals belong; and
  dynamically increase or decrease a size of the first part, depending on the detected number of the neighbor cells.

(Supplementary Note 3)
The processing apparatus according to Supplementary Note 1 or 2, wherein the at least one processor is configured to decrease a size of the first part as the number of the neighbor cells increases.

(Supplementary Note 4)
The processing apparatus according to any one of Supplementary Notes 1 to 3, wherein the at least one processor is configured to select, based on the number of the neighbor cells, one of dividing patterns each of which divides the D2D radio resources into a different number of parts.

(Supplementary Note 5)
The processing apparatus according to any one of Supplementary Notes 1 to 4, wherein the at least one processor is configured to:
  when the number of the neighbor cells is a first number, determine the first part in accordance with a first dividing pattern that divides the D2D radio resources into two or more parts; and
  when the number of the neighbor cells is a second number larger than the first number, determine the first part in accordance with a second dividing pattern that divides the D2D radio resources into three or more parts, wherein
  each part of the first and second dividing patterns includes resources that are allocatable to D2D transmission performed by a D2D communication pair belonging to a corresponding cell, and a total size of the radio resources included in the first part in the second dividing pattern is smaller than a total size of the radio resources included in the first part in the first dividing pattern.

(Supplementary Note 6)
The processing apparatus according to Supplementary Note 5, wherein the first dividing pattern comprises a plurality of different dividing patterns that periodically alternate with each other.

(Supplementary Note 7)
The processing apparatus according to Supplementary Note 5 or 6, wherein
  each part of the first and second dividing patterns is associated with a single cell group including a plurality of cells, and
  the at least one processor is configured to determine the first part, depending further on whether the one or more neighbor cells includes a cell belonging to a cell group that the first cell belongs to.

(Supplementary Note 8)
The processing apparatus according to any one of Supplementary Notes 1 to 7, wherein the at least one processor is configured to determine the first part, depending further on a number of the one or more neighbor-cell D2D radio terminals.

(Supplementary Note 9)
The processing apparatus according to Supplementary Note 8, wherein the at least one processor is configured to decrease a size of the first part as the number of the one or more neighbor-cell D2D radio terminals increases.

(Supplementary Note 10)
The processing apparatus according to any one of Supplementary Notes 1 to 9, wherein the at least one processor is further configured to select, from the first part, radio resources allocated to D2D transmission performed by the first D2D communication pair.

(Supplementary Note 11)
The processing apparatus according to any one of Supplementary Notes 1 to 10, wherein the processing apparatus is arranged in a first base station configured to serve the first cell.

(Supplementary Note 12)
The processing apparatus according to Supplementary Note 10, wherein the at least one processor is configured to:
  receive, from a second base station serving a second cell, information regarding a D2D radio terminal that belongs to the first cell and is located in proximity to a D2D communication pair belonging to the second cell; and
  determine the first part, depending further on the information.

(Supplementary Note 13)
The processing apparatus according to Supplementary Note 12, wherein the information indicates whether proximity between a D2D communication pair in the second cell and a D2D radio terminal belonging to the first cell has been detected.

(Supplementary Note 14)
The processing apparatus according to any one of Supplementary Notes 11 to 13, wherein the at least one processor is configured to send, to a second base station serving a second cell, information regarding a D2D radio terminal that belongs to the second cell and is located in proximity to the first D2D pair.

(Supplementary Note 15)

The processing apparatus according to one of Supplementary Notes 11 to 14, wherein the at least one processor is configured to:

select, based on the number of the neighbor cells, one of dividing patterns to be used for allocation of radio resources to the first D2D communication pair, wherein each of the dividing patterns divides the D2D radio resources into a different number of parts each of which includes resources allocatable to D2D transmission performed by a D2D communication pair belonging to a corresponding cell; and notify a base station serving a neighbor cell of the selected dividing pattern.

(Supplementary Note 16)

The processing apparatus according to any one of Supplementary Notes 1 to 10, wherein the processing apparatus is arranged in a radio terminal.

(Supplementary Note 17)

The processing apparatus according to Supplementary Note 16, wherein the at least one processor is configured to detect the one or more neighbor-cell D2D radio terminals, using a discovery procedure for discovering one or more radio terminals or one or more radio terminal groups, and the discovery procedure comprises transmitting to or receiving from another radio terminal a signal including an information element for identifying whether it is discovery for D2D communication or discovery for another purpose.

(Supplementary Note 18)

A method comprising:

acquiring a number of one or more neighbor cells to which one or more neighbor-cell D2D radio terminals, located in proximity to a first device-to-device (D2D) communication pair belonging to a first cell, belong; and depending on the number of the one or more neighbor cells, determining, from D2D radio resources that are shared among three or more cells including the first cell, a first part allocatable to the first D2D communication pair.

(Supplementary Note 19)

The method according to Supplementary Note 18, wherein the acquiring comprises:

detecting the one or more neighbor-cell D2D radio terminals; and detecting the number of one or more neighbor cells to which the detected one or more neighbor-cell D2D radio terminals belong, and the determining comprises dynamically increasing or decreasing a size of the first part, depending on the detected number of the neighbor cells.

(Supplementary Note 20)

The method according to Supplementary Note 18 or 19, wherein the determining comprises reducing a size of the first part as the number of the neighbor cells increases.

(Supplementary Note 21)

The method according to any one of Supplementary Notes 18 to 20, wherein the determining comprises selecting, based on the number of the neighbor cells, one of dividing patterns each of which divides the D2D radio resources into a different number of parts.

(Supplementary Note 22)

The method according to any one of Supplementary Notes 18 to 21, wherein the determining comprises:

when the number of the neighbor cells is a first number, determining the first part in accordance with a first dividing pattern that divides the D2D radio resource into two or more parts; and when the number of the neighbor cells is a second number larger than the first number, determining the first part in accordance with a second dividing pattern that divides the D2D radio resources into three or more parts, wherein each part of the first and second dividing patterns includes resources that are allocatable to D2D transmission performed by a D2D communication pair belonging to a corresponding cell, and a total size of the radio resources included in the first part in the second dividing pattern is smaller than a total size of the radio resources included in the first part in the first dividing pattern.

(Supplementary Note 23)

The method according to Supplementary Note 22, wherein the first dividing pattern comprises a plurality of different dividing patterns that periodically alternate with each other.

(Supplementary Note 24)

The method according to any one of Supplementary Notes 18 to 23, further comprising selecting, from the first part, a radio resource allocated to D2D transmission performed by the first D2D communication pair.

(Supplementary Note 25)

A non-transitory computer readable medium storing a program for causing a computer to perform the method according to any one of Supplementary Notes 18 to 24.

(Supplementary Note 26)

A base station configured to serve a first cell, the base station comprising:

at least one memory; and at least one processor coupled to the at least one memory and configured to:

detect one or more neighbor-cell D2D radio terminals located in proximity to a first device-to-device (D2D) communication pair belonging to the first cell; and send, to a second base station serving a second cell, information regarding a D2D radio terminal that belongs to the second cell and is located in proximity to the first D2D communication pair.

(Supplementary Note 27)

A method in a base station configured to serve a first cell, the method comprising:

detecting one or more neighbor-cell D2D radio terminals located in proximity to a first device-to-device (D2D) communication pair belonging to the first cell; and sending, to a second base station serving a second cell, information regarding a D2D radio terminal that belongs to the second cell and is located in proximity to the first D2D communication pair.

(Supplementary Note 28)

A non-transitory computer readable medium storing a program for causing a computer to perform a method in a base station configured to serve a first cell, wherein the method comprises:

detecting one or more neighbor-cell D2D radio terminals located in proximity to a first device-to-device (D2D) communication pair belonging to the first cell; and sending, to a second base station serving a second cell, information regarding a D2D radio terminal that belongs to the second cell and is located in proximity to the first D2D communication pair.

(Supplementary Note 29)

A base station configured to serve a first cell, the base station comprising:

at least one memory; and at least one processor coupled to the at least one memory and configured to:

detect a number of one or more neighbor cells to which one or more neighbor-cell D2D radio terminals located in proximity to a first device-to-device (D2D) communication pair belonging to the first cell belong;

select, based on the number of the neighbor cells, one of dividing patterns to be used for allocation of radio resources to the first D2D communication pair, wherein each of the dividing patterns divides the D2D radio resources into a different number of parts each of which includes resources allocatable to D2D transmission performed by a D2D communication pair belonging to a corresponding cell; and notify a base station serving a neighbor cell of the selected dividing pattern.

(Supplementary Note 30)

A method in a base station configured to serve a first cell, the method comprising:

detecting a number of one or more neighbor cells to which one or more neighbor-cell D2D radio terminals located in proximity to a first device-to-device (D2D) communication pair belonging to the first cell belong;

selecting, based on the number of the neighbor cells, one of dividing patterns to be used for allocation of radio resources to the first D2D communication pair, wherein each of the dividing patterns divides the D2D radio resources into a different number of parts each of which includes resources allocatable to D2D transmission performed by a D2D communication pair belonging to a corresponding cell; and notifying a base station serving a neighbor cell of the selected dividing pattern.

(Supplementary Note 31)

A non-transitory computer readable medium storing a program for causing a computer to perform a method in a base station configured to serve a first cell, wherein the method comprises:

detecting a number of one or more neighbor cells to which one or more neighbor-cell D2D radio terminals located in proximity to a first device-to-device (D2D) communication pair belonging to the first cell belong;

selecting, based on the number of the neighbor cells, one of dividing patterns to be used for allocation of radio resources to the first D2D communication pair, wherein each of the dividing patterns divides the D2D radio resources into a different number of parts each of which includes resources allocatable to D2D transmission performed by a D2D communication pair belonging to a corresponding cell; and notifying a base station serving a neighbor cell of the selected dividing pattern.

(Supplementary Note 32)

A radio terminal comprising:

at least one memory; and at least one processor coupled to the at least one memory and configured to detect one or more neighbor-cell device-to-device (D2D) radio terminals, using a discovery procedure for discovering one or more radio terminals or one or more radio terminal groups, wherein the discovery procedure comprises transmitting to or receiving from another radio terminal a signal including an information element for identifying whether it is discovery for D2D communication or discovery for another purpose.

(Supplementary Note 33)

A method in a radio terminal, the method comprising:

detecting one or more neighbor-cell device-to-device (D2D) radio terminals, using a discovery procedure for discovering one or more radio terminals or one or more radio terminal groups, wherein the discovery procedure comprises transmitting to or receiving from another radio terminal a signal including an information element for identifying whether it is discovery for D2D communication or discovery for another purpose.

(Supplementary Note 34)

A non-transitory computer readable medium storing a program for causing a computer to perform a method in a radio terminal, wherein the method comprises detecting one or more neighbor-cell device-to-device (D2D) radio terminals, using a discovery procedure for discovering one or more radio terminals or one or more radio terminal groups, wherein the discovery procedure comprises transmitting to or receiving from another radio terminal a signal including an information element for identifying whether it is discovery for D2D communication or discovery for another purpose.

This application is based upon and claims the benefit of priority from Japanese patent application No. 2017-082806, filed on Apr. 19, 2017, the disclosure of which is incorporated herein in its entirety by reference.

REFERENCE SIGNS LIST

1 UE
2 D2D COMMUNICATION PAIR
3 eNB
31 CELL
101 D2D LINK

What is claimed is:

1. A processing apparatus comprising:

at least one memory; and at least one processor coupled to the at least one memory and configured to:

acquire a number of one or more neighbor cells to which one or more neighbor-cell D2D radio terminals, located in proximity to a first device-to-device (D2D) communication pair belonging to a first cell, belong; and depending on the number of the one or more neighbor cells, determine, from D2D radio resources that are shared among three or more cells including the first cell, a first part allocatable to the first D2D communication pair.

2. The processing apparatus according to claim 1, wherein the at least one processor is configured to:

detect the one or more neighbor-cell D2D radio terminals;

detect the number of one or more neighbor cells to which the detected one or more neighbor-cell D2D radio terminals belong; and dynamically increase or decrease a size of the first part, depending on the detected number of the neighbor cells.

3. The processing apparatus according to claim 1, wherein the at least one processor is configured to decrease a size of the first part as the number of the neighbor cells increases.

4. The processing apparatus according to claim 1, wherein the at least one processor is configured to select, based on the number of the neighbor cells, one of dividing patterns each of which divides the D2D radio resources into a different number of parts.

5. The processing apparatus according to claim 1, wherein the at least one processor is configured to:
when the number of the neighbor cells is a first number, determine the first part in accordance with a first dividing pattern that divides the D2D radio resources into two or more parts; and
when the number of the neighbor cells is a second number larger than the first number, determine the first part in accordance with a second dividing pattern that divides the D2D radio resources into three or more parts, wherein
each part of the first and second dividing patterns includes resources that are allocatable to D2D transmission performed by a D2D communication pair belonging to a corresponding cell, and
a total size of the radio resources included in the first part in the second dividing pattern is smaller than a total size of the radio resources included in the first part in the first dividing pattern.

6. The processing apparatus according to claim 5, wherein the first dividing pattern comprises a plurality of different dividing patterns that periodically alternate with each other.

7. The processing apparatus according to claim 5, wherein each part of the first and second dividing patterns is associated with a single cell group including a plurality of cells, and
the at least one processor is configured to determine the first part, depending further on whether the one or more neighbor cells includes a cell belonging to a cell group that the first cell belongs to.

8. The processing apparatus according to claim 1, wherein the at least one processor is configured to determine the first part, depending further on a number of the one or more neighbor-cell D2D radio terminals.

9. The processing apparatus according to claim 8, wherein the at least one processor is configured to decrease a size of the first part as the number of the one or more neighbor-cell D2D radio terminals increases.

10. The processing apparatus according to claim 1, wherein the at least one processor is further configured to select, from the first part, radio resources allocated to D2D transmission performed by the first D2D communication pair.

11. The processing apparatus according to claim 1, wherein the processing apparatus is arranged in a first base station configured to serve the first cell.

12. The processing apparatus according to claim 11, wherein the at least one processor is configured to:
receive, from a second base station serving a second cell, information regarding a D2D radio terminal that belongs to the first cell and is located in proximity to a D2D communication pair belonging to the second cell; and
determine the first part, depending further on the information.

13. The processing apparatus according to claim 12, wherein the information indicates whether proximity between a D2D communication pair in the second cell and a D2D radio terminal belonging to the first cell has been detected.

14. The processing apparatus according to claim 11, wherein the at least one processor is configured to send, to a second base station serving a second cell, information regarding a D2D radio terminal that belongs to the second cell and is located in proximity to the first D2D pair.

15. The processing apparatus according to claim 11, wherein the at least one processor is configured to:
select, based on the number of the neighbor cells, one of dividing patterns to be used for allocation of radio resources to the first D2D communication pair, wherein each of the dividing patterns divides the D2D radio resources into a different number of parts each of which includes resources allocatable to D2D transmission performed by a D2D communication pair belonging to a corresponding cell; and
notify a base station serving a neighbor cell of the selected dividing pattern.

16. The processing apparatus according to claim 1, wherein the processing apparatus is arranged in a radio terminal.

17. The processing apparatus according to claim 16, wherein
the at least one processor is configured to detect the one or more neighbor-cell D2D radio terminals, using a discovery procedure for discovering one or more radio terminals or one or more radio terminal groups, and
the discovery procedure comprises transmitting to or receiving from another radio terminal a signal including an information element for identifying whether it is discovery for D2D communication or discovery for another purpose.

18. A method comprising:
acquiring a number of one or more neighbor cells to which one or more neighbor-cell D2D radio terminals, located in proximity to a first device-to-device (D2D) communication pair belonging to a first cell, belong; and
depending on the number of the one or more neighbor cells, determining, from D2D radio resources that are shared among three or more cells including the first cell, a first part allocatable to the first D2D communication pair.

19. A non-transitory computer readable medium storing a program for causing a computer to perform a method comprising:
acquiring a number of one or more neighbor cells to which one or more neighbor-cell D2D radio terminals, located in proximity to a first device-to-device (D2D) communication pair belonging to a first cell, belong; and
depending on the number of the one or more neighbor cells, determining, from D2D radio resources that are shared among three or more cells including the first cell, a first part allocatable to the first D2D communication pair.

* * * * *